US012614467B1

(12) United States Patent  
    Zhang

(10) Patent No.: US 12,614,467 B1  
(45) Date of Patent: Apr. 28, 2026

(54) SYSTEM OF AND METHOD FOR AUTOMATED FLIGHT PLANNING FOR URBAN AIR MOBILITY

(71) Applicant: University of South Florida, Tampa, FL (US)

(72) Inventor: Yu Zhang, Tampa, FL (US)

(73) Assignee: University of South Florida, Tampa, FL (US)

( * ) Notice: Subject to any disclaimer, the term of this patent is extended or adjusted under 35 U.S.C. 154(b) by 340 days.

(21) Appl. No.: 18/315,664

(22) Filed: May 11, 2023

(51) Int. Cl.
| | |
|---|---|
| *G08G 5/34* | (2025.01) |
| *G06F 16/29* | (2019.01) |
| *G08G 5/22* | (2025.01) |
| *G08G 5/55* | (2025.01) |
| *G08G 5/59* | (2025.01) |

(52) U.S. Cl.  
    CPC ............... *G08G 5/34* (2025.01); *G06F 16/29* (2019.01); *G08G 5/22* (2025.01); *G08G 5/55* (2025.01); *G08G 5/59* (2025.01)

(58) Field of Classification Search  
    CPC .. G08G 5/34; G08G 5/22; G08G 5/55; G08G 5/59; G06F 16/29  
    See application file for complete search history.

(56) References Cited

U.S. PATENT DOCUMENTS

| | | | | |
|---|---|---|---|---|
| 2019/0129039 | A1* | 5/2019 | Schubert | ................... G08G 5/80 |
| 2020/0324898 | A1* | 10/2020 | Youmans | ............. G06V 20/176 |
| 2021/0390867 | A1* | 12/2021 | Kim | .......................... G08G 5/22 |
| 2022/0327939 | A1* | 10/2022 | Gurusamy | ............ G06T 15/205 |
| 2022/0335841 | A1* | 10/2022 | Huncha | .................... G08G 5/76 |
| 2022/0397917 | A1* | 12/2022 | Arksey | .................. G05D 1/695 |
| 2023/0282121 | A1* | 9/2023 | Ali | ..................... G01C 21/3807 |
| | | | | 701/409 |
| 2023/0343226 | A1* | 10/2023 | Bieringer | ................. G08G 5/20 |

OTHER PUBLICATIONS

Barliba, F. C., Gheorghescu, I. C., & Moscovici, A. M. (2017). The advantages of using mobile GIS technology. (Year: 2017).*

* cited by examiner

*Primary Examiner* — Stephanie T Su  
(74) *Attorney, Agent, or Firm* — Andrew Behrens; Trenam Law

(57) ABSTRACT

Described herein relates to a system and method of optimizing a flight path of an aerial vehicle within an urban air environment. As such, the flight planning system may be configured to provide management and traffic management services to multiple Urban Air Mobility (hereinafter "UAM") operators. Additionally, the flight planning system may comprise Low-Altitude Airspace Management Subsystem (hereinafter "LAMS"), which may generate a nodal network of flyable airspace, routing and/or intersection information for all vertiport pairs, and a Low-Altitude Traffic Management Subsystem (hereinafter "LTMS"), which may detect and/or may resolve potential conflicts of flight operations and/or may generate at least one conflict-free 4D trajectory. Additionally, the flight planning system may be configured to input at least one flight operation request (e.g., origin vertiport, destination vertiport, departure time, and/or arrival time), such that the flight planning system may generate conflict-free 4D trajectories while evaluating system costs and/or equity among operators.

20 Claims, 11 Drawing Sheets

100

200

SYSTEM OF AND METHOD FOR AUTOMATED FLIGHT PLANNING FOR URBAN AIR MOBILITY

BACKGROUND OF THE INVENTION

1. Field of the Invention

This invention relates, generally, to flight planning. More specifically, it relates to a system and method for optimizing flight plans of simultaneous vertical take-off and landing vehicles (hereinafter "VTOLs") operations within an urban air environment.

2. Brief Description of the Prior Art

Tremendously increasing interest by the industry and the public in Urban Air Mobility (hereinafter "UAM") and Advanced Air Mobility (hereinafter "AAM") has been observed over the past few years. In this manner, a market of $1.5 trillion by 2040 has been forecasted by Morgan Stanley. Currently, the legacy Air Traffic Management (hereinafter "ATM") system is heavily dependent on human operators, who may not be able to accommodate the density of operations UAM/AAM expects within the next twenty years. Additionally, the current communication, navigation, and surveillance (hereinafter "CNS") technologies, airspace structure, and procedures available over low-altitude urban airspace are designed for helicopters and General Aviation (hereinafter "GA") aircraft, but have failed to account for high-density AAM operations, particularly for UAM Maturity Levels (hereinafter "UML") of 4 and/or above as defined by NASA. Therefore, the existing ATM system is not suitable for present and/or future AAM operations, let alone capable of realizing and/or accommodating the unique challenges that UAM brings, which have been consistently identified and warned about by third-party service providers.

Accordingly, what is needed is automatic, safe, effective, and efficient system and method for flight planning within an urban air environment. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. An aspect of the present disclosure pertains to a method of automatically generating a flight path of an aerial vehicle within an urban air environment. In an embodiment, the method may comprise the steps of: (a) loading, into a memory of the computing device, at least one imaging database comprising a plurality of building feature points and/or at least one flight operation request, such that the at least one flight operation request may comprise at least one vertiport and/or a flight path of at least one alternative aerial vehicle, such that the plurality of building feature points may be configured to be clustered based on at least one dimension of at least one preidentified building; (b) producing, via at least one processor, at least one three-dimensional map based on the at least one imaging database by: (i) identifying, via the at least one processor, a building footprint based on at least one cluster of the plurality of building feature points; and (ii) generating, via the processor, at least one two-dimensional bounding box surrounding a perimeter of the building footprint; (c) calculating, via the at least one processor, a shortest flight path between at least two of the plurality of vertiports based on the at least two vertiports, the flight operation request, or both; and (d) automatically displaying, via the at least one processor, the calculated shortest flight path within the at least one three-dimensional map on a display device associated with computing device by: (i) responsive to the determination that the calculated shortest flight path does not include any portion of the least one bounding box between the at least two vertiports, highlighting the calculated shortest flight path in a high contrast color; and (ii) responsive to the determination that the calculated shortest flight path includes portion of the at least one bounding box between the at least two vertiports, removing the calculated shortest path from the at least one three-dimensional map.

In some embodiments, the method may further comprise the step of determining the at least one shortest flight path further includes the steps of: (A) identifying, via the at least one processor, at least one portion of the at least one bounding box between the at least two vertiports based on the at least one inputted vertiport and/or flight operation request; (B) calculating, via the at least one processor, at least one flight path between the at least two vertiports, such that the at least one flight path may not intersect and/or include any portion of the at least one bounding box between the at least two vertiports; and (C) selecting, via the at least one processor, the shortest flight path, such that the shortest flight path may comprise the lowest total distance and/or total amount of time, or both.

In some embodiments, the method may further comprise the step of, receiving, via the at least one processor of the computing device an input of a designated airspace and/or restricted airspace, based on the aerial vehicle. Additionally, in these other embodiments, the step of producing the three-dimensional map may further comprise the steps of: (A) identifying, via the at least one processor, the plurality of building feature points within the inputted designated airspace; and (B) removing, via the at least one processor, each of the plurality of building feature points not within the inputted designated airspace.

In addition, in some embodiments, the step of generating the at least one bounding box may further include the step of, converting, via the at least one processor, at least one cluster of the plurality of building feature points into at least one cluster of raster points with respect to the designated airspace. In this manner, the three dimensional map may be a geographic information system (hereinafter "GIS") map. Moreover, in some embodiments, the method may further comprise the step of, receiving, via the at least one user interface associated with the computing device of the flight planning system, an input from a user to generate the at least one shortest path between the at least two vertiports. In these other embodiments, the method may further comprise the step of, after automatically displaying the at least one shortest path within the at least one three-dimensional map on the display device associated with the computing device, automatically recording, via the at least one processor, within the memory of the computing device, the at least one vertiport and/or the at least one flight operation request.

Another aspect of the present disclosure pertains to a method of automatically generating an optimized flight path of an aerial vehicle within an urban air environment. In an embodiment, the method may comprise the steps of: (a) loading, into a memory of the computing device, at least one imaging database comprising a plurality of building feature points and/or at least one flight operation request, such that the at least one flight operation request may comprise at least one vertiport and/or a flight path of at least one alternative aerial vehicle, such that the plurality of building feature points may be configured to be clustered based on at least one dimension of at least one preidentified building; (b) producing, via at least one processor, at least one three-dimensional map based on the at least one imaging database by: (i) identifying, via the processor, a building footprint based on at least one cluster of the plurality of building feature points; and (ii) generating, via the processor, at least one two-dimensional bounding box surrounding a perimeter of the building footprint; (c) calculating, via the at least one processor, a shortest flight path between at least two of the plurality of vertiports based on the at least two vertiports, the flight operation request, or both; (d) comparing, via the at least one processor, the calculated shortest flight path and a flight path of at least one alternative aerial vehicle; and (e) automatically displaying the conflict free flight path within the at least one three-dimensional map on a display device associated with the computing device by: (i) responsive to the determination that the conflict free flight path does not include any portion of the at least one bounding box between the at least two vertiports and/or does not intersect with the shortest path of at least one alternative aerial vehicle, highlighting the shortest path in a high contrast color on a display device associated with the computing device; and (ii) responsive to the determination that the conflict free flight path includes any portion of the at least one bounding box between the at least two vertiports and/or does not intersect with the shortest path of at least one alternative aerial vehicle, removing the calculated at least one shortest path from the at least one three-dimensional map.

In some embodiments, the method may further comprise the step of determining the at least one shortest flight path further includes the steps of: (A) identifying, via the at least one processor, at least one portion of the at least one bounding box between the at least two vertiports based on the at least one inputted vertiport and/or flight operation request; (B) calculating, via the at least one processor, at least one flight path between the at least two vertiports, such that the at least one flight path may not intersect and/or include any portion of the at least one bounding box between the at least two vertiports; and (C) selecting, via the at least one processor, the shortest flight path, such that the shortest flight path may comprise the lowest total distance and/or total amount of time, or both.

In some embodiments, the method may further comprise the step of, receiving, via the at least one processor of the computing device an input of a designated airspace and/or restricted airspace, based on the aerial vehicle. Additionally, in these other embodiments, the step of producing the three-dimensional map may further comprise the steps of: (A) identifying, via the at least one processor, the plurality of building feature points within the inputted designated airspace; and (B) removing, via the at least one processor, each of the plurality of building feature points not within the inputted designated airspace.

In addition, in some embodiments, the step of generating the at least one bounding box may further include the step of, converting, via the at least one processor, at least one cluster of the plurality of building feature points into at least one cluster of raster points with respect to the designated airspace. In this manner, the three dimensional map may be a GIS map. Moreover, in some embodiments, the method may further comprise the step of, receiving, via the at least one user interface associated with the computing device of the flight planning system, an input from a user to generate the at least one shortest path between the at least two vertiports. In these other embodiments, the method may further comprise the step of, after automatically displaying the at least one shortest path within the at least one three-dimensional map on the display device associated with the computing device, automatically recording, via the at least one processor, within the memory of the computing device, the at least one vertiport and/or the at least one flight operation request.

Furthermore, an additional aspect of the present disclosure pertains to a flight planning optimization system for automatically optimizing a flight plan for an aerial vehicle within an urban air environment. In an embodiment, the flight planning optimization system may comprise the following: (a) a computing device having at least one processor; and (b) a non-transitory computer-readable medium operably coupled to the at least one processor, the computer-readable medium having computer-readable instructions stored thereon that, when executed by the at least one processor, cause the flight planning optimization system to automatically optimize the flight plan of the aerial vehicle within the urban air environment by executing instructions comprising: (i) loading, into a memory of the computing device, at least one imaging database comprising a plurality of building feature points and/or at least one flight operation request, such that the at least one flight operation request may comprise at least one vertiport and/or a flight path of at least one alternative aerial vehicle, such that the plurality of building feature points may be configured to be clustered based on at least one dimension of at least one preidentified building; (ii) producing, via at least one processor, at least one three-dimensional map based on the at least one imaging database by: (A) identifying, via the processor, a building footprint based on at least one cluster of the plurality of building feature points; and (B) generating, via the processor, at least one two-dimensional bounding box surrounding a perimeter of the building footprint; (iii) calculating, via the at least one processor, a shortest flight path between at least two of the plurality of vertiports based on the at least two vertiports and/or the flight operation request; (iv) comparing, via the at least one processor, the calculated shortest flight path and a flight path of at least one alternative aerial vehicle; and (v) automatically displaying the conflict free flight path within the at least one three-dimensional map on a display device associated with the computing device by: (A) responsive to the determination that the conflict free flight path does not include any portion of the at least one bounding box between the at least two vertiports and/or does not intersect with the shortest path of at least one alternative aerial vehicle, highlighting the shortest path in a high contrast color on a display device associated with the computing device; and (B) responsive to the determination that the conflict free flight path includes any portion of the at least one bounding box between the at least two vertiports and/or does not intersect with the shortest path of at least one alternative aerial vehicle, removing the calculated at least one shortest path from the at least one three-dimensional map.

In some embodiments, the executed instructions may further comprise the step of, receiving, via the at least one processor of the computing device, an input of a designated airspace and/or restricted airspace, based on the aerial vehicle.

In some embodiments, the executed instructions may further comprise the steps of: (i) identifying, via the at least one processor, the plurality of building feature points within the inputted designated airspace; and (ii) removing, via the at least one processor, each of the plurality of building feature points not within the inputted designated airspace. Additionally, in these other embodiments, the step of determining the at least one shortest flight path may further include the steps of: (iii) identifying, via the at least one processor, at least one portion of the at least one bounding box between the at least two vertiports based on the at least one inputted vertiport and/or at least one flight operation request; (iv) calculating, via the at least one processor, at least one flight path between the at least two vertiports, such that the at least one flight path may not intersect and/or include, any portion of the at least one bounding box between the at least two vertiports; and (v) selecting, via the at least one processor, the shortest flight path, such that the shortest flight path may comprise the lowest total distance and/or total amount of time.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
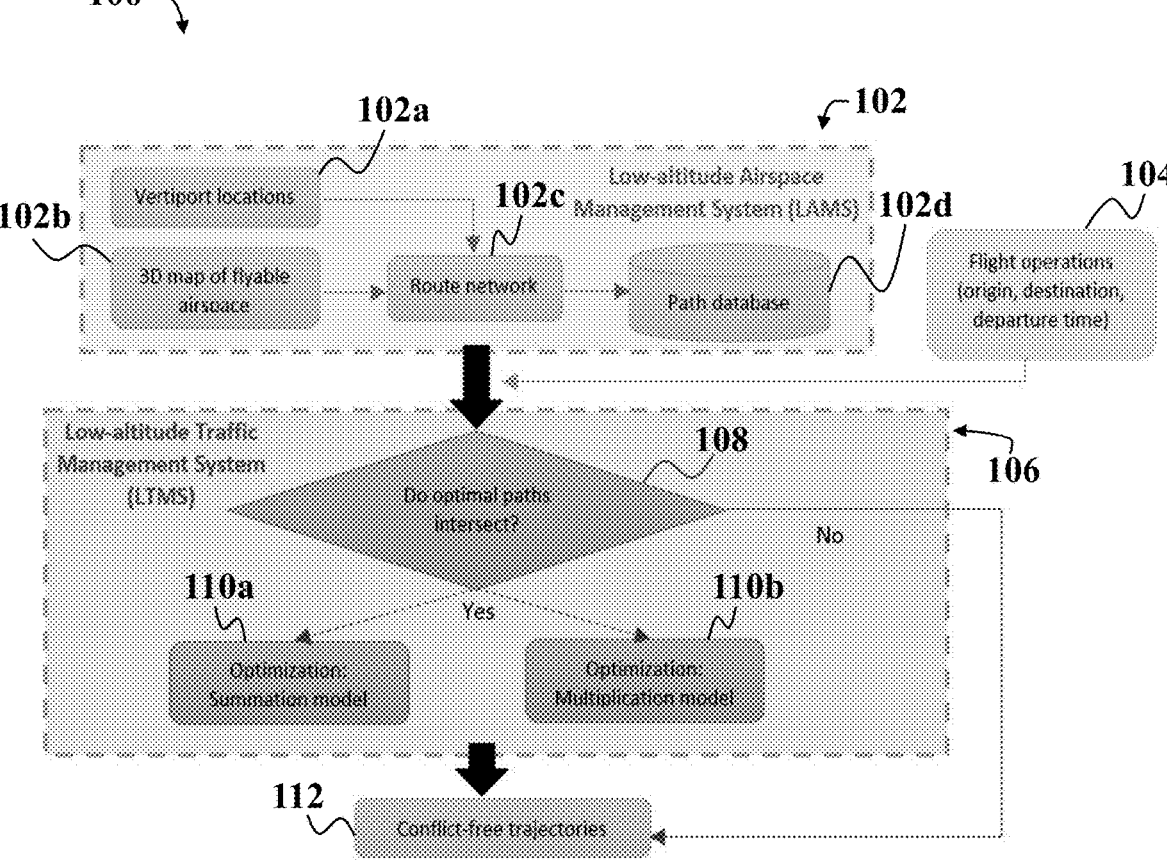
FIG. 1 is an exemplary process flow diagram illustrating a method of optimizing automated flight plans of VTOL operations within an urban air environment, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++, Python, MATLAB, or the like and conventional procedural programming languages, such as the "C" programming language or similar programming languages.

Aspects of the present invention are described below with reference to flowchart illustrations and/or block diagrams of methods, apparatus (e.g., systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, the term "about" or "roughly" refers to approximately or nearly and in the context of a numerical value or range set forth means ±15% of the numerical.

As used herein the term "aerial vehicle" refers to any vehicle known in the art which may be configured to travel through the air by gaining support from the air. The aerial vehicle may be an aircraft (e.g., a jet), a helicopter, a blimp, an electric aircraft, standard aircraft, vertical takeoff aircraft, and/or an unmanned aerial vehicle (e.g., a drone, an electric jet, an electric helicopter). For ease of reference, the exemplary embodiment, described herein, refers to a drone, a helicopter, and/or a jet, but this description should not be interpreted as limiting to other aircraft.

As used herein, the term "input(s)" or "flight operation request(s)" refers to any flight operation data known in the art which may be integrated into a flight plan. The input may be an origin, a destination, a conflict, a departure time, and/or a flight path. For ease of reference, the exemplary embodiment described herein refers to at least one origin, at least one destination, and/or at least on departure time, but this descriptions should not be interpreted as exclusionary of other flight operation data.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Urban Air Mobility Flight Planning System

The present disclosure system of and method for optimizing automated flight plans of a large amount of unmanned and/or manned aerial vehicles service with vertical takeoff and/or landing (hereinafter "VTOL") vehicles operations within an urban air environment. In this manner, the VTOL may comprise any aerial vehicle known in the art which may implement a vertical takeoff and/or landing, including but not limited to combustion and/or electric aerial vehicles. In an embodiment, the flight planning system may be configured to be integrated into a flight path and/or route software and/or system of at least one aerial vehicle. As stated above, traditional flight planning determines route, flying altitude, speed, and/or the minimum necessary fuel on board for the at least one aerial vehicle for the objective of minimizing operating cost. In addition, for VTOL vehicles, monitoring a battery level and/or determining a charging schedule of the VTOL vehicles may be critical when creating a flight plan for the at least one aerial vehicle.

In an embodiment, the flight planning system may optimize emerging advanced air mobility/urban air mobility by minimizing operating cost of VTOL operations and/or ensuring no potential conflicts during the flight of the VTOL vehicle. In this manner, the flight planning system may comprise a computing device having at least one processor, such that the flight planning system may be configured to detect a distance between an origin and at least one destination of a flight. This is a critical component of the flight planning system, as tactical operational decisions may be dependent on the number of charging pads at each vertiport and/or optimal flight operational scheduling optimizing a fuel amount and/or battery charge available for the at least one aerial vehicle. Accordingly, in this embodiment, the flight planning system may be configured to generate at least one conflict-free 4D trajectory during a high-density urban air mobility (hereinafter "UAM") operation. As such, the flight planning system will be described in greater detail below.

FIG. 1 depicts an exemplary process flow diagram depicting a method 100 of optimizing an automated flight planning within an urban air environment, according to an embodiment of the present disclosure. The steps delineated in FIG. 1 are merely exemplary of an order of analyzing and/or providing a condition assessment of developing the automated flight plan, which includes a low-altitude airspace management system (hereinafter "LAMS") and a low-altitude traffic management system (hereinafter "LTMS"). The steps may be carried out in another order, with or without additional steps included therein.

As shown in FIG. 1, in an embodiment, method 100 begins at steps 102a-102d comprising the LAMS 102 of the flight planning system. In this embodiment, at step 102a. LAMS 102 may be configured to input in a memory of the computing device and/or provide, via the at least one processor, at least one location of at least one vertiport, in addition to, at step 102b, input and/or provide, via the at least one processor, a three-dimensional (hereinafter "3D") map of flyable airspace (i.e., a UAM environment). Next at step 102c. LAMS 102 of the flight planning system may be configured to construct a route network, based on the inputted and/or provided at least one vertiport location, designated and/or selected airspace, and/or 3D map of flyable airspace. Finally, at step 102d, in this embodiment, the flight planning system may be configured to input into the memory of the computing device, via the at least one processor, the generated route network, the 3D map of flyable airspace, and/or the at least one vertiport into a path database, such that a user may be able to select the route vertiport, and/or 3D map, as needed, via at least one user-interface associated with the computing device. For example, in some embodiments, LAMS 102 may be configured to designate an airspace of less than or equal to 400 ft as used specifically for drone delivery and/or an airspace comprising a range of at least 500 ft to at most 1400 ft, encompassing every integer in between, for urban, metropolitan, and/or intercity cargo and/or passenger transportation.

In this manner, in an embodiment, the flight planning system may be configured to provide at least one flight operation request to at least one user, such that the at least one user may input the at least one flight operation request into a server and/or the memory of the computing device, via at least the one user interface. Accordingly, in an embodiment, the flight planning system may be configured to incorporate the at least one flight operation request inputted by the at least one user, such that the flight planning system may be configured to alter at least one aspect of a designated portion of the flyable airspace allowed for the at least one aerial vehicle, with respect to FAA regulations related to the at least one aerial vehicle (e.g., increase or decrease the range of designated airspace for drone delivery). Furthermore, in this embodiment, the flight planning system may be configured to assign a plurality of flight layers to at least one portion of the designated airspace, such that the flight planning system may automatically identify at least one obstruction and/or automatically calculate at least one obstruction avoidance and/or trajectory deconfliction, via at least one machine learning algorithm.

Figure 2:
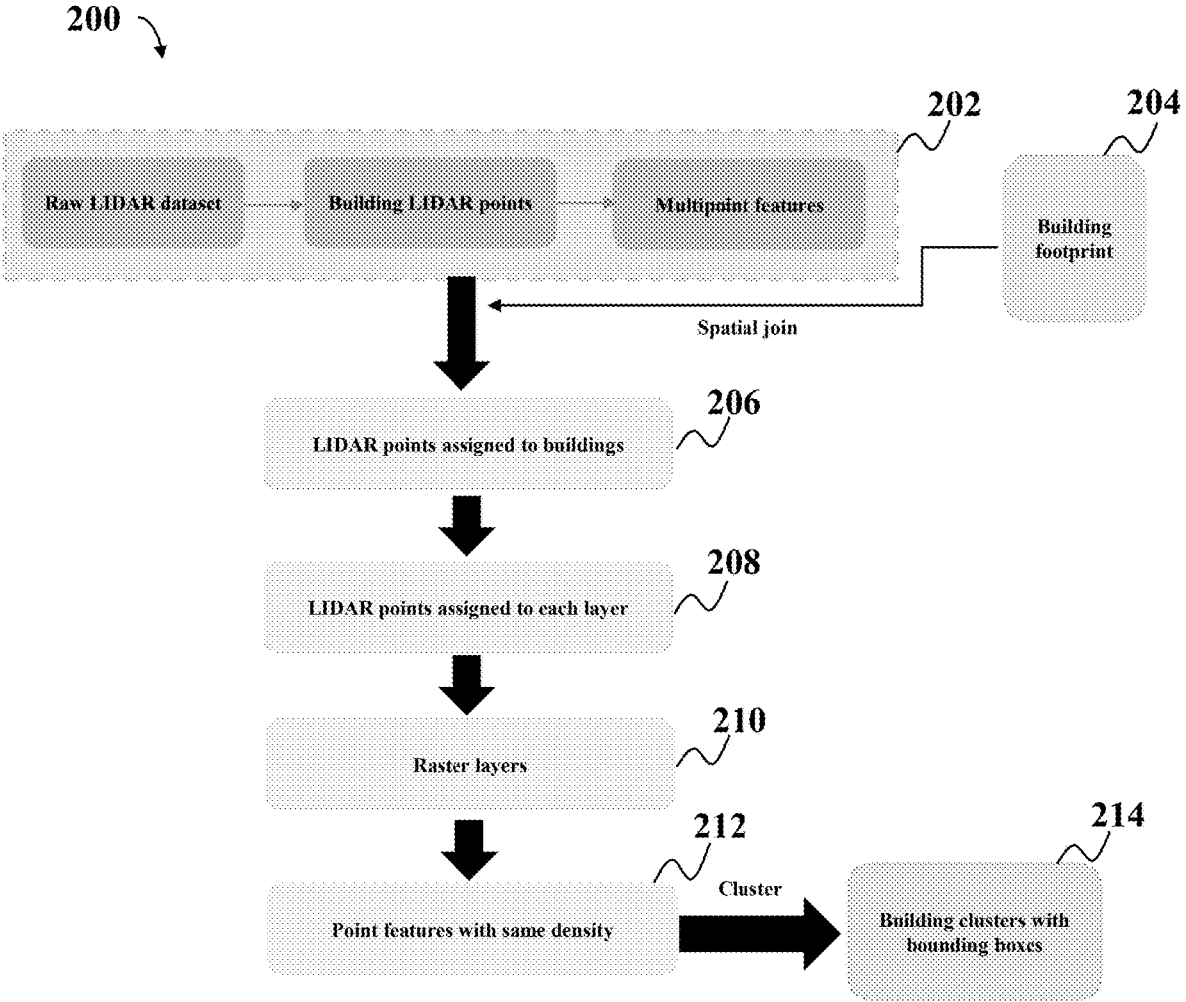
FIG. 2 is an exemplary process flow diagram illustrating a method of generating a 3D map, for the automated flight planning system, according to an embodiment of the present disclosure.

FIG. 2 depicts an exemplary process flow diagram depicting a method 200 of generating a 3D GIS map (i.e., step 102b of FIG. 1), according to an embodiment of the present disclosure. As such, in an embodiment, method 200 may include a spatial clustering analysis, such that the flight system may be configured to determine the connection between at least one flight layer and at least one alternative flight layer (e.g., UAM flight levels). In this manner, the flight system may indicate at least one group of clustered buildings, via at least one bounding box surrounding a border of the at least one group of building clusters, based on each selected flight layer by the user and/or the flight system.

Figure 3:
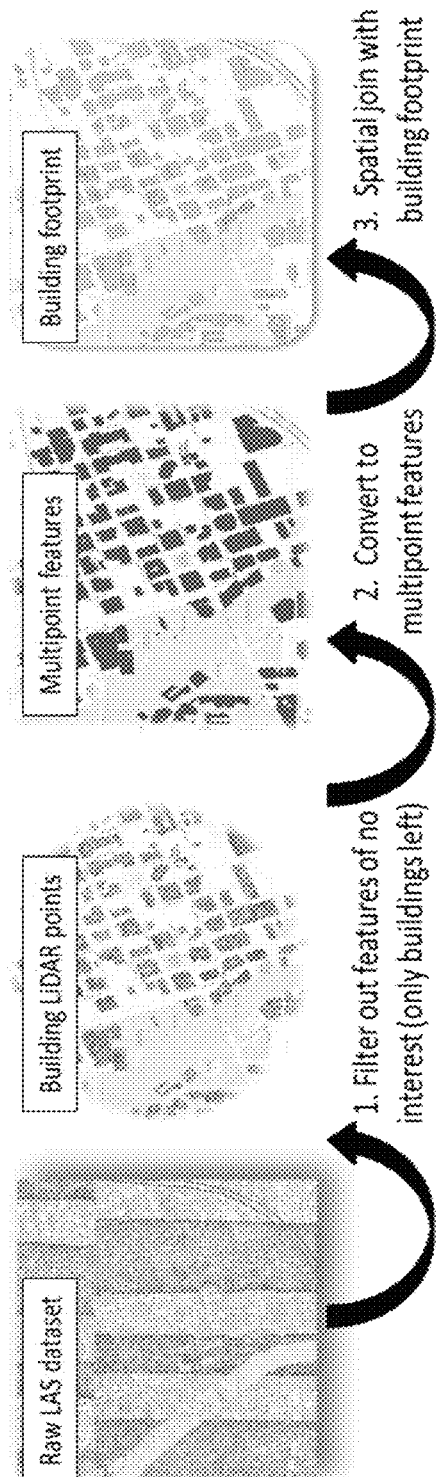
FIG. 3 is an exemplary diagram illustrating a method of generating a building footprint from a plurality of building feature points, according to an embodiment of the present disclosure.

As shown in FIG. 2, in conjunction with FIG. 1, in an embodiment, the flight planning system may be configured to be communicatively coupled to at least one third-party imaging database (e.g., Google Maps Static API, LiDAR), such at least one imaging dataset may be inputted into the flight planning system, allowing the flight planning system to automatically select and/or designate at least one regulated airspace and/or any corresponding regulation with respect to the at least one selected and/or designated airspace based on the at least one flight operation request provided by the user. As such, in this embodiment, within LAMS 102, method 200 begins at steps 202b, in which the flight planning system may be configured to identify at least one building feature point within the at least one imaging dataset (e.g., LiDAR dataset) based on at least one dimension (e.g., a perimeter, a height, a length, a width, a volume, etc.) of the at least one building. In this manner, the at least one imaging data set may comprise multi-feature three-dimensional data, such that multiple two-dimensional planes may be created from the three-dimensional data based on the at least one selected and/or designated airspace. As such, when the at least one building feature point has been identified, the flight planning system may be configured filter out at least one non-building feature (e.g., a sidewalk and/or a tree) from at least one imaging dataset (e.g., LiDAR dataset), as shown in FIG. 3, such that only the at least one building feature point may remain within the at least one filtered imaging dataset. In addition, in some embodiments, the user may be configured to identify and/or select at least one building feature point and/or at least one non-building feature point within the at least one imaging dataset, via the at least one user interface communicatively coupled to the flight planning system. Accordingly, in this embodiment, at step 204, the flight planning system may then automatically identify and/or retain the at least one building feature point within the memory of the computing device, creating at least one building footprint.

Figure 4:
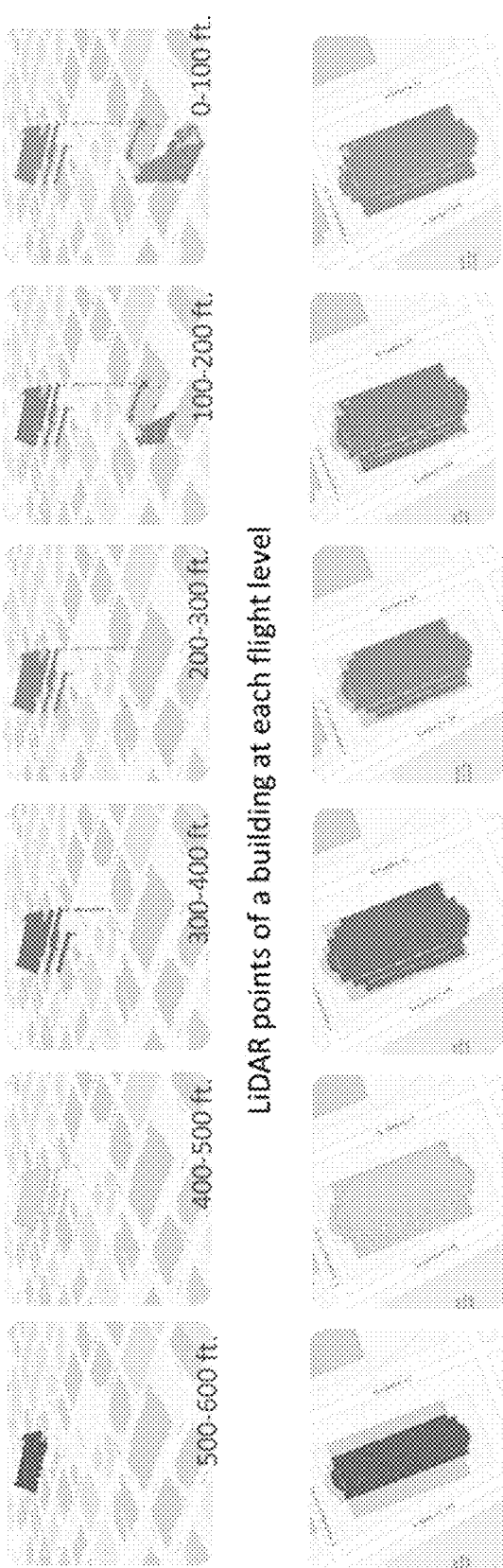
FIG. 4 is a exemplary diagram illustrating a projection of LiDAR points at and above at least one of a plurality of flight layers, according to an embodiment of the present disclosure.
Figure 5:
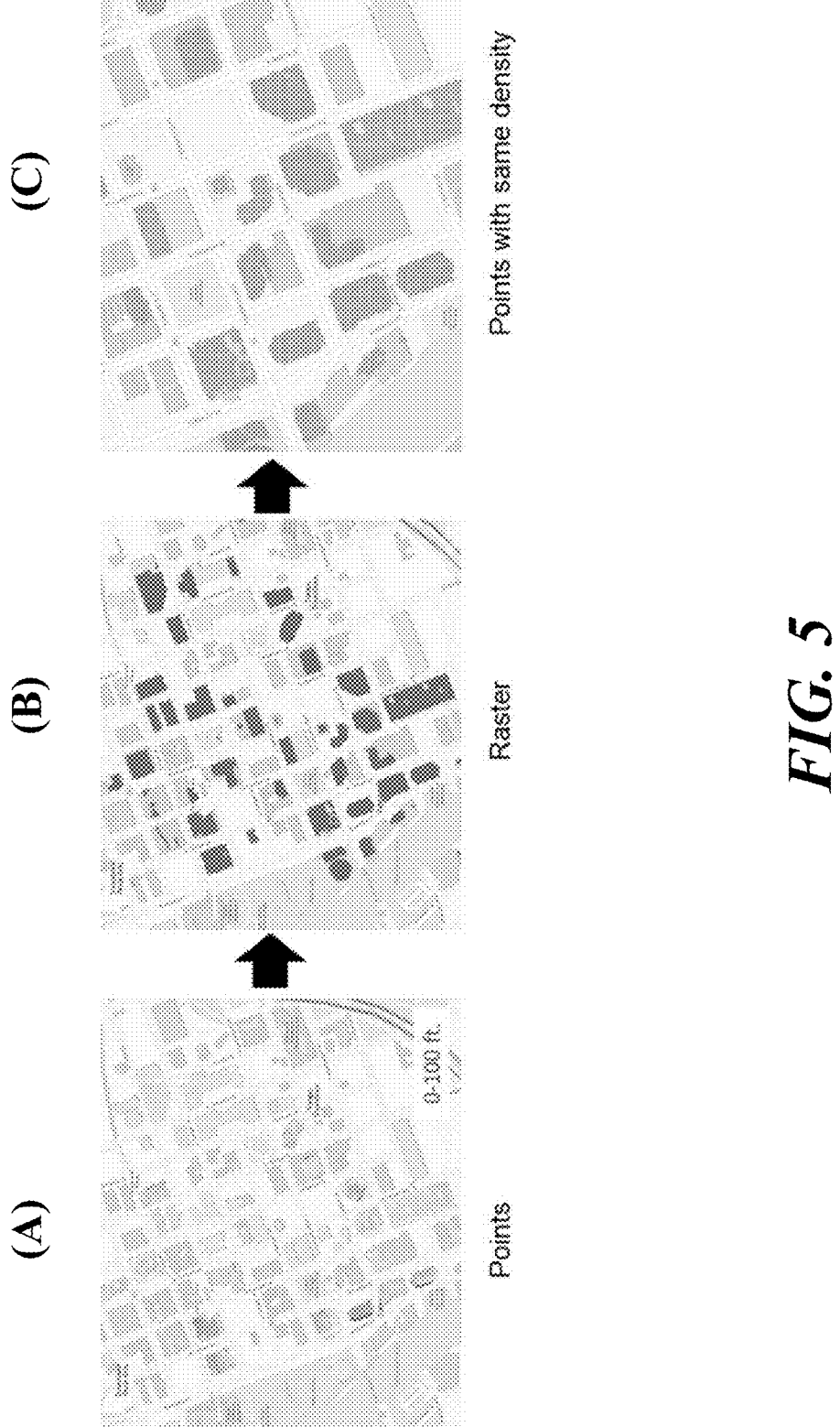
FIG. 5 is an exemplary diagram illustrating a method of LiDAR point density unification for a predetermined airspace, according to an embodiment of the present disclosure.

Next, as shown in FIG. 2, in conjunction with FIGS. 3-5, at step 206 of method 20, in an embodiment, subsequent to the creating the at least one building footprint, the flight planning system may be configured to dispose and/or integrate at least one point cloud (i.e., at least one building feature point) into the at least one building footprint, such that the at least one point cloud may be associated with the at least one building footprint. However, as known in the art, the space occupied by the building is blocked and not allowed to pass by the at least one aerial vehicle but the at least one point cloud may only represent the surface of the building. As such, during step 208, as shown in FIG. 2, in conjunction with FIG. 4 and FIG. 5, in this embodiment, the flight planning system may be configured to assign at least one portion of the at least one point cloud of the at least one building footprint to each of the plurality of flight layers associated with the imaging dataset, with respect to the designated and/or selected airspace. In this manner, in this embodiment, the flight planning system may be configured to fill up a space above and/or below the designated and/or selected portion of the plurality of flight layers, such that a 3D space may be filled within at least one dimension (e.g., the perimeter, the height, the length, the width, etc.) of the at least one building footprint.

Figure 6:
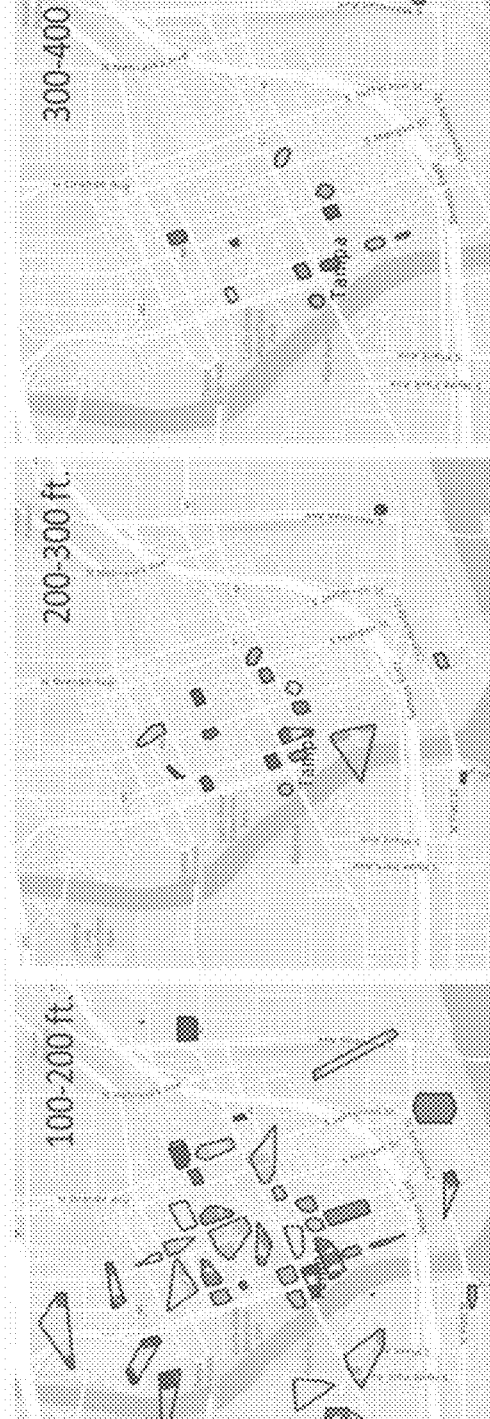
FIG. 6 is an imaging dataset comprising at least one bounding box surrounding an obstacle (e.g., a building and/or restricted airspace) associated with at least one designated airspace of an aerial vehicle, according to an embodiment of the present disclosure.

Moreover, in an embodiment, as shown in FIG. 2, in conjunction with FIG. 4 and FIG. 5, method 200 may proceed to step 210 and step 212, in which the flight planning system may be configured to create a density of the at least one points consistent, such that the assignment of each building feature point within the at least one point cloud (e.g., a plurality of building feature points) of the at least one building footprint at each of the plurality of flight layers may be identical. To make point density consistent, in this embodiment, the flight planning system may be configured to convert the at least one building data point of the at least one point cloud to at least one raster data point at each of the plurality of flight layers (e.g., at least one raster band), and/or subsequent to converting the at least one building data point to the at least one of the plurality of flight layers, the flight planning system may then convert back and/or modify the at least one raster data point to the at least one point cloud, such that each of the building feature points may comprise the same density for each of the plurality of flight layers. Finally at step 214 of method 200 as shown in FIGS. 5-6, in this embodiment, the flight planning system may comprise at least one K-means clustering algorithm, such that for each of the plurality of flight layers, the flight planning system may be configured to cluster each of the reconverted building feature points (e.g., the point cloud) within the at least one building footprint.

As such, if at least one building feature point may be assigned to at least one alternative cluster (e.g., a building feature cluster at an alternative airspace), the flight planning system may modify each point by (i) counting a total amount of points from the same building footprint for at least one alternative cluster; (ii) selecting a building feature cluster comprising the largest size of data points; and (iii) labeling all data points within the same building footprint to the selected building feature cluster. Additionally, in this embodiment, once each building feature cluster has been created and/or modified, the flight planning system may then be configured to dispose a bounding box about a boundary of the at least one building footprint, such that at a designated airspace and/or flight layer, if the at least one building footprint comprises at least one datapoint within the building feature cluster, the flight planning system may dispose at least one bounding box about at least one dimension (e.g., the perimeter and/or the height of the building within the designated and/or selected airspace) of the at least one building footprint, as shown in FIG. 6.

Additionally, as described above, as shown in FIG. 6, in an embodiment, the flight planning system may be configured to designate every pixel and/or aspect within the at least one bounding box as the at least one obstacle (e.g., an edge and/or node of the building footprint, or restricted airspace as provided by the FAA), such that any flight path may not be allowed to pass through the at least one obstacle (e.g., any aspect and/or pixel within the at least one bounding box). Accordingly, in this embodiment, the flight planning system may generate at least one flight path that abuts but does not intersect the perimeter of the at least one bounding box. Additionally, in an embodiment, as shown in FIG. 5 and FIG. 6, based on the designated and/or selected airspace, at least one alternative bounding box may be added and/or removed with respect to the at least one building feature point within each of the plurality of flight layers. For example, in some embodiments, if the at least one building cluster may comprise at least one building feature point within at least one of the plurality of flight layers with respect to the designated airspace of at least 400—to at most 500 ft, at least one bounding box may be disposed about the building cluster. However, these embodiments, if the at least one building cluster fails to comprise at least one building feature point within at least one of the plurality of flight layers with respect to the designated airspace of at least 400—to at most 500 ft, the at least one bounding box may be removed and/or not disposed about the building cluster.

Figure 7A:
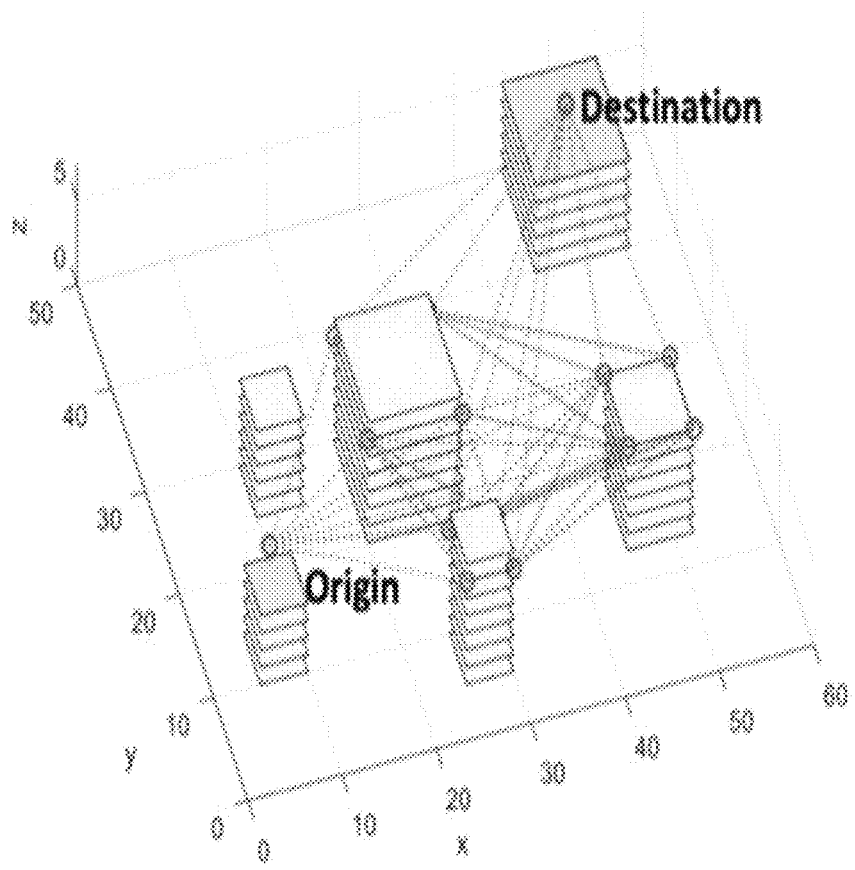
FIG. 7A is a visibility graph illustrating at least one possible path between one origin and one destination vertiport for one flight level, according to an embodiment of the present disclosure.
Figure 7B:
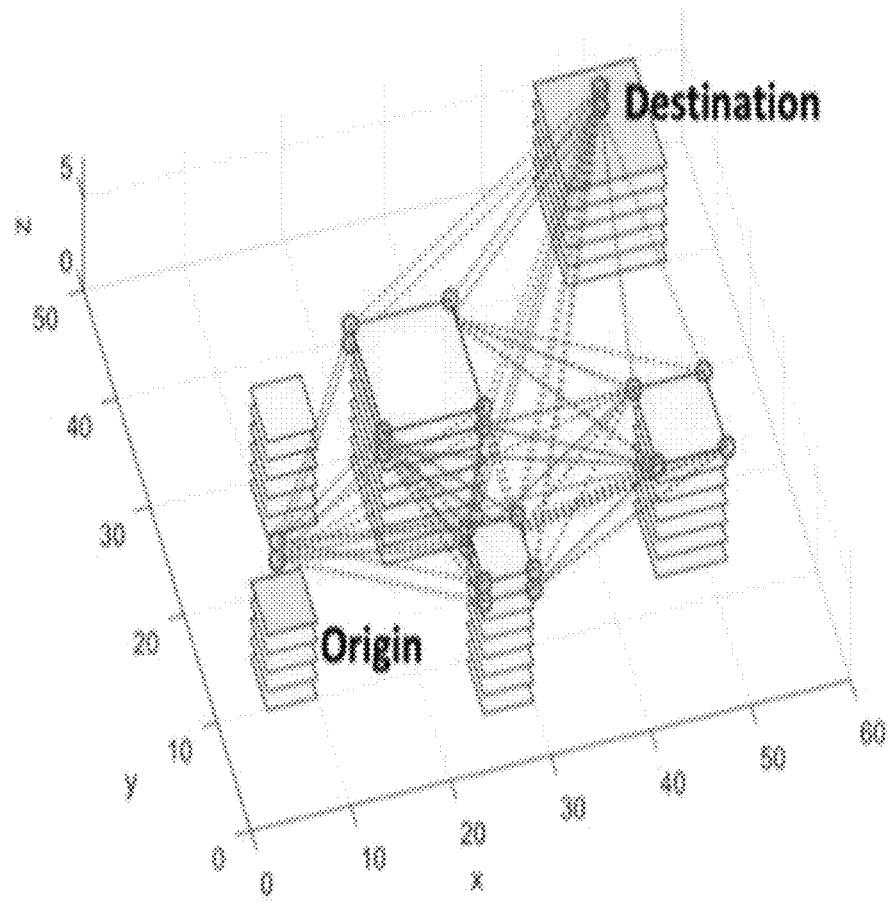
FIG. 7B is a visibility graph illustrating a possible path between one origin and one destination vertiport for three flight levels, according to an embodiment of the present disclosure.
Figure 7C:
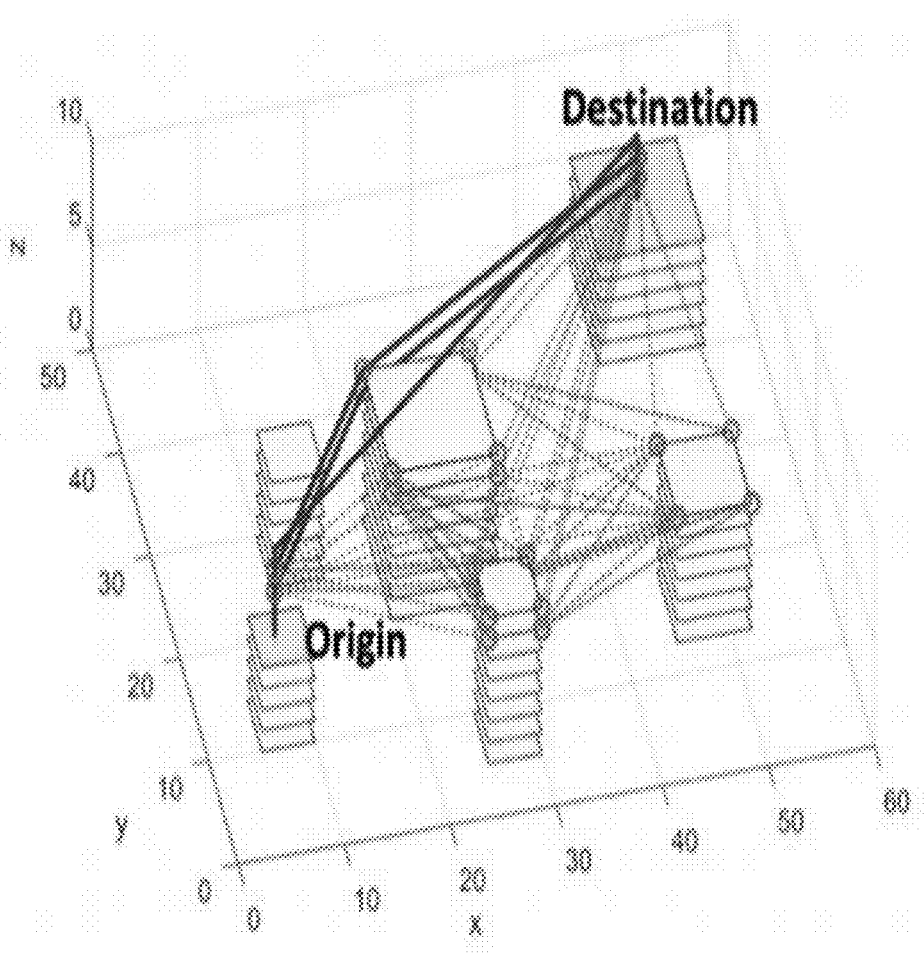
FIG. 7C is the visibility graph of FIG. 7B illustrating at least one calculated shortest path at different flight levels highlighted in blue-color, according to an embodiment of the present disclosure.

Referring again to FIG. 1, in conjunction with FIGS. 7A-7C, within LAMS 102, at 102b and 102c, in an embodiment, the flight planning system may be configured to generate at least one route network (e.g., a nodal network). As such, in this embodiment, the flight planning system may be configured to generate a shortest flight path and/or at least one alternative flight path for at least one flight operation between an origin, a destination vertiport, and/or at least one alternative destination vertiport. Accordingly, in these embodiments, the building clusters of the multi-dimensional (e.g. three dimensional (hereinafter "3D")) map may be configured to be displayed as at least one multi-dimensional geometrical configuration (e.g., a box) in in the multi-dimensional map based on the designated airspace (i.e., the designated and/or selected flight layer(s) of the plurality of flight layers) selected by the flight planning system and/or the user, via the at least one user interface. Moreover, in this embodiment, the flight planning system may be configured to display the multi-dimensional map comprising the shortest path and/or at least one alternative path on a display device associated with the computing device, via the at least one processor.

Based on the origin vertiport location, the destination vertiport location, and/or the at least one alternative destination vertiport, the processor of the flight planning system may be configured to execute instructions such that a visibility graph (e.g., at least one three-dimensional map), as shown in FIGS. 7A-7C, may display at least one flight path of the flight operation from the origin vertiport to the destination vertiport and/or the at least one alternative vertiport at a designated and/or selected airspace (e.g., a designated and/or selected flight layer of the plurality of flight layers), as required and/or determined for the UAM. In this manner, the flight system may be configured to calculate and/or display at least one flight path that avoids at least one obstacle (e.g., a high-rise building and/or restricted airspace) in-between the origin vertiport, the destination vertiport, and/or the at least one alternative destination vertiport. FIG.

7B shows the visibility graph with possible paths of the flight operation from the origin vertiport to the destination vertiport at three different UAM flight level by avoiding obstacles. FIG. 7C highlights the shortest paths of the flight operation at three different flight levels.

As such, at step 102*c*, as shown in FIG. 1, in conjunction with FIGS. 7A-7C, in an embodiment, the at least flight planning system may be configured to determine at least one obstacle (e.g., at least one edge and/or node of the building footprint at each of the plurality of flight layers, restricted airspace within of the designated and/or airspace, such that at least one obstacle may be displayed in a low contrast color on the at least one visibility graph. Next, as shown in FIG. 7B, once the flight system and/or the user selects the origin vertiport, the destination vertiport, and/or the at least one alternative vertiport, based on the designated and/or selected airspace, flight planning system may configured to dispose and/or display on the visibility graph, via the at least one processor, at least one obstacle at the designated flight layer, at the designated flight layer and a predetermined amount of flight layers above and/or below the designated flight layer (e.g., 2-3 flight layers above and below), and/or at every flight layer within the plurality of flight layers. Furthermore, in this embodiment, as shown in FIG. 7C, based on the at least obstacle identified and/or disposed within the visibility graph by the flight planning system, the flight planning system may then be configured to calculate and/or display at least one the shortest flight path and/or at least one alternative flight path on the display device associated with the computing device.

In this embodiment, the flight planning system may also be configured to provide and/or display the shortest flight path and/or at least one alternative flight path traversing through the designated and/or selected airspace and/or at least one alternative flight layer above and/or below the designated and/or selected airspace, based on the at least one denied obstacle. Furthermore, as shown in FIG. 7C, in an embodiment, the flight planning system may display the shortest flight path and/or the at least one alternative flight path a high contrast color scheme (e.g., green, blue, and/or yellow) within the visibility graph on the display device, such that the at least one user may be able to easily identify (i.e., recognize) the shortest flight path and/or the at least one alternative flightpath as compared to the low contrast color of the at least one obstacle. Accordingly, in this embodiment, the flight planning system may be configured to specifically designate the flight path with the lowest total obstacles as the shortest flight path. As such in some embodiments, the flight planning system may designate the shortest flight path with a higher contrast and/or different color as compared to the at least one alternative flight path (e.g., the shortest flight path being blue, the at least one alternative flight path being green) Additionally, in these other embodiments, the flight planning system may be configured to transmit a notification indicative of the shortest flight path on the display device, such that the user may readily identify the shortest flight path as compared to the at least one alternative flight path (e.g., a text box, an auditory message, a tactile output).

Additionally, in some embodiments, the flight planning system may be configured to transmit a notification to the at least one user indicative of an estimated time of travel and/or time until completion of travel based on the at least one of the shortest paths selected by the at least one user. In these other embodiments, the flight planning system may also provide at least one flight path comprising the origin vertiport and at least one alternative destination vertiport that may be within a predetermined range (e.g., 50 miles-100 miles) from the destination vertiport.

Figure 8:
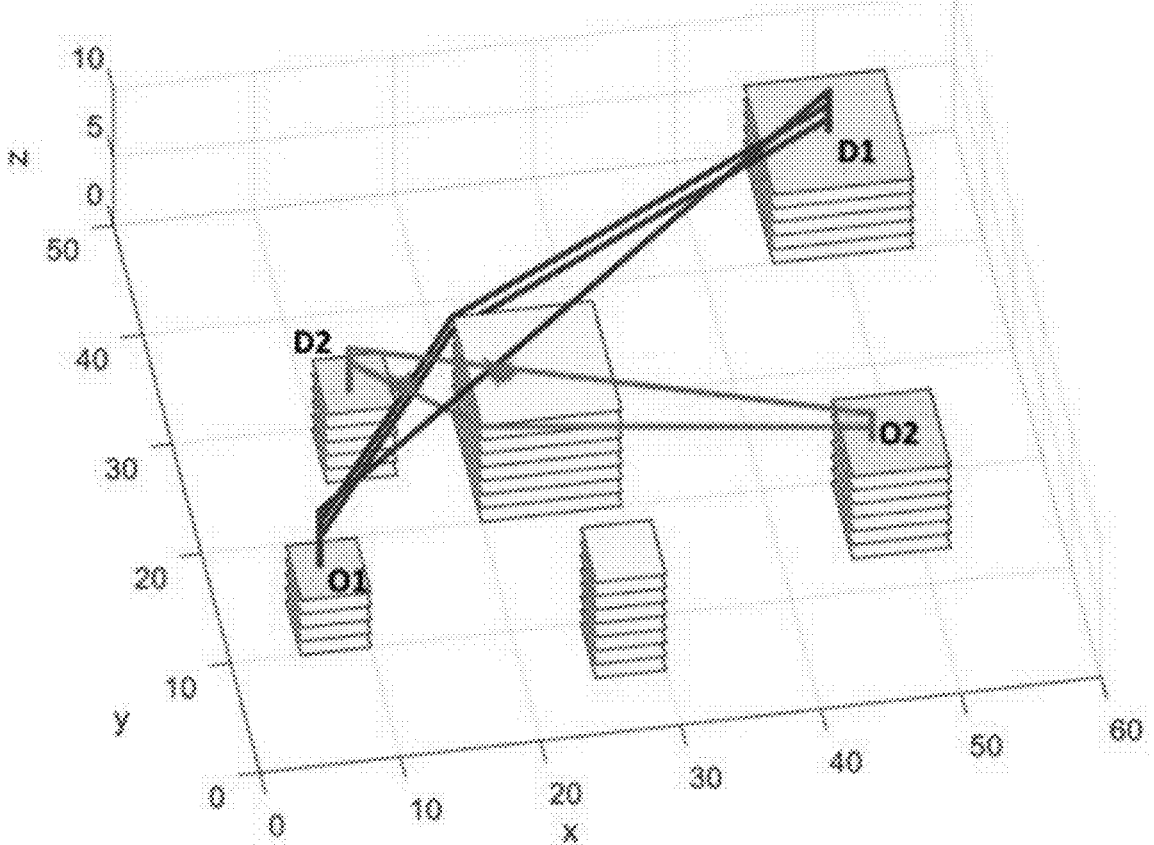
FIG. 8 is a graph illustrating shortest paths at different levels for two origin-destination vertiport pairs and the intersections of paths at different levels, highlighted with red stars, according to an embodiment of the present disclosure.

Moreover, referring again to FIG. 1, in conjunction with FIGS. 3-8, within LAMS 102, at step 102*d*, in an embodiment, the flight planning system may be configured to store the calculated and/or determined shortest flight path and/or at least one alternative flight path within the memory of the computing device and/or at least one flight path server in electrical communication with the flight planning system. As such, in this embodiment, the at least one flight path server may be a third-party database a flight planning system server and/or an external hard-drive, such that the at least one processor of the flight planning system may be configured to transmit the calculated shortest flight path and/or at least one alternative flight path to the memory of the computing device and/or to the at least one flight path server. In addition the shortest flight path and/or the at least one alternative flight path may be configured to be transmitted from the memory of the computing device and/or the at least one flight path server to LTMS 106 of the flight planning system. Furthermore, the at least one flight planning server may be configured to input at least one alternative aerial vehicle's flight path, such that the flight planning system may be configured to input the at least one alternative aerial vehicle's shortest flight path and/or at least one alternative path when calculating the shortest flight path and/or the at least one alternative flight path for the VTOL vehicle. For example, as shown in FIG. 8, in this embodiment, the flight planning system may be configured to display at least one intersection (e.g., intersection of at least one 3D trajectory) between the shortest flight path and/or an alternative flight path for the VTOL vehicle and the shortest flight path and/or an alternative flight path of at least one alternative aerial vehicle on the visibility graph on the display device of the flight planning system.

In an embodiment, the at least one flight path server and/or the memory of the computing device may be configured to be trained, retrained, and/or updated based on the calculated and/or selected shortest flight path and/or the at least one alternative flight path transmitted to the at least one flight server and/or memory of the computing device from the LAMS 102. In this manner, in this embodiment, if LAMS 102 determines a new shortest flight path based on the additional information provided to LAMS 102 (e.g., removal and/or addition of at least one obstacle), the flight planning system may be configured to retrain and/or update the at least one flight path server, such that the retrained shortest flight path and/or the at least one retrained alternative flight path may be provided to the at least one user of the VTOL vehicle, instead of the original shortest flight path. Accordingly, in this embodiment, at least one database may be created to store the calculated and/or selected shortest flight path and/or the at least one alternative flight path at each of the plurality of flight layers and/or the additional information of potential intersections of the at least one obstacle and/or the shortest flight path and/or the at least one alternative flight path of at least one alternative aerial vehicle.

Furthermore, another aspect of the present disclosure is that LTMS 106 of the flight planning system may be communicatively coupled with the LAMS 102 and/or the at least one processor of the flight planning system. Accordingly, as shown in FIG. 1, at step 104 of method 100, the flight planning system may be configured to have at least one flight operation request (e.g., origin vertiport, destination vertiport, at least one alternative destination vertiport, and/or a desired departure time) inputted into the system by the at least one user, via the at least one user-interface, and/or may be inputted automatically by the at least one processor of the flight planning system based on previous flights and/or flight operation requests. For example, in this embodiment, when the at least one user selects the at least one flight operation request, the at least one processor may transmit a signal to the least one flight server and/or a third-party database, such that the requested flight operation may be transmitted to the flight planning system, integrating the flight operation request into LTMS 106 of the flight planning system. Additionally, in some embodiments, the flight planning system may be configured to update and/or retrain the at least one flight server and/or memory of the computing device, allowing the flight planning system to provide at least one suggestive flight operation request based on the at least one retrained flight operation request.

As such, given the at least one flight operation request, referring again to FIG. 1, during step 106, in an embodiment, LTMS 106 may be configured to calculate the optimal shortest path of each vertiport pair (e.g., a shortest flight path and/or the flight path that consumes the least total energy after considering aircraft dynamics (e.g., air resistance, fuel consumption, etc.) for these operations). Furthermore, during step 106, at 108, LTMS 106 of the flight planning system may be configured to be communicatively coupled with the at least one path flight path server, the memory of the computing device and/or at least one third-party database, such that LTMS 106 of the flight planning system may then identify an optimal flight path (i.e., a flight path comprising the shortest distance between the origin vertiport and the destination vertiport, which requires the least amount of total energy loss), the shortest flight path, and/or at least one alternative flight path, in addition to determining if any conflict may be present with the optional flight path, the shortest flight path, and/or the at least one alternative flight path, after considering the departure time of at least one flight, the flight path of at least one alternative aerial vehicle, and/or the energy loss of the VTOL vehicle based on the calculated flight paths (e.g., a 2D trajectory, a 3D trajectory and/or a four-dimensional (hereinafter "4D") trajectory) (e.g., the optimal flight path may cross with the flight path of at least one alternative aerial vehicle and/or aerial vehicle, as shown in FIG. 8 and FIG. 9, and/or at least one).

Additionally, as shown in FIG. 1, in an embodiment, once the at least one data point is received from the memory of the computing device, the at least one flight path server, and/or the third-party database based on the at least one flight operation request, the method 100 proceeds to step 108, in which LTMS 106 determines whether the calculated optimal flight path, the shortest flight path, and/or the at least one alternative flight path intersect with at least one flight path (e.g., optimal flight path, shortest flight path, etc.) of the VTOL vehicle and/or of at least one alternative aerial vehicle. If the answer is "Yes", two mathematical programs, summation model and multiplication model, will be used for conflict resolution, with the former focusing on minimizing total flight time, and the later considering treating different UAM operators fairly while minimizing the total flight time.

Figure 9:
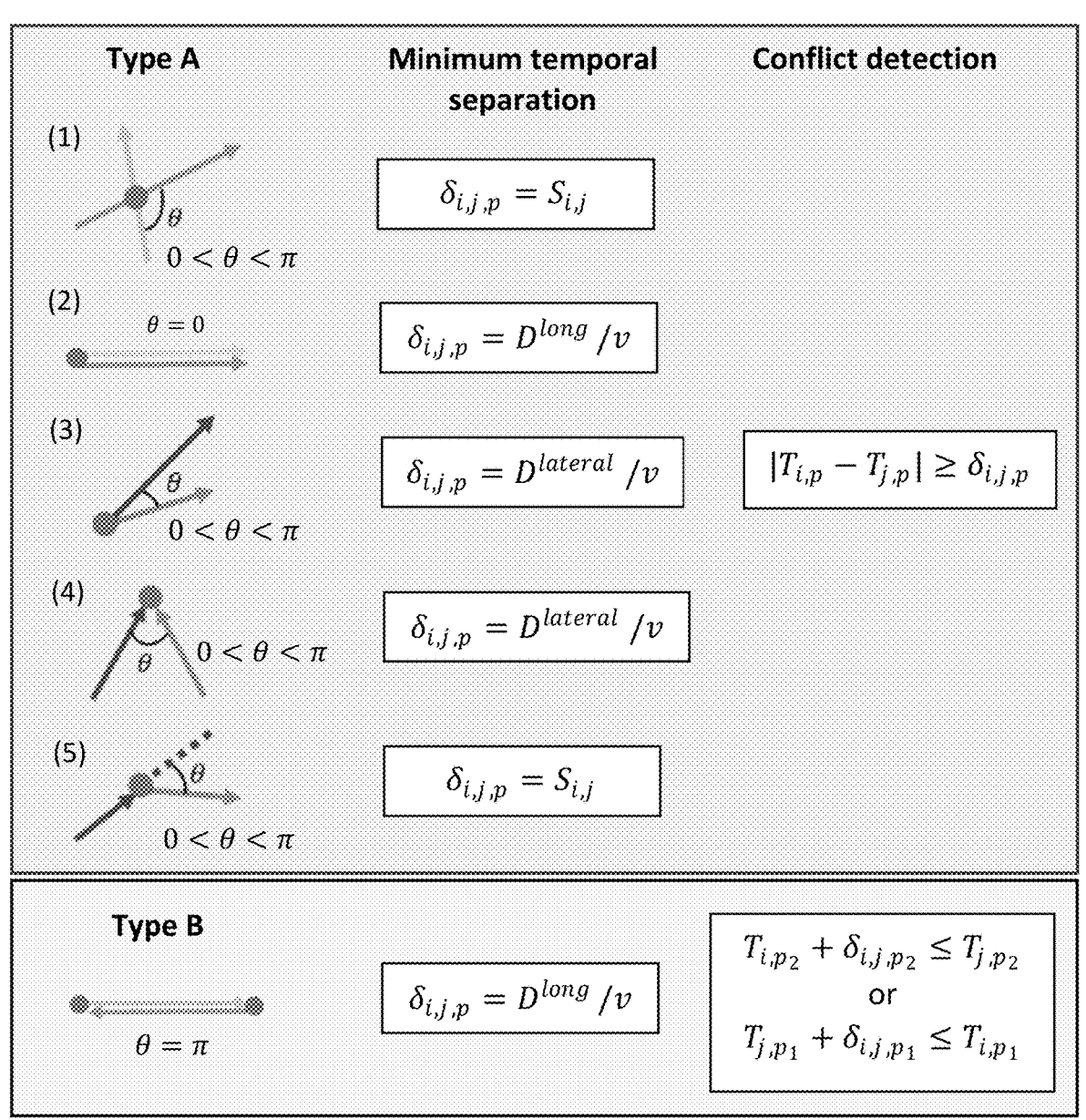
FIG. 9 is a diagram illustrating a Type A potential conflict and a Type B potential conflict, in addition to a minimum temporal separation calculation for the Type A potential conflict and the Type B potential conflict, according to an embodiment of the present disclosure.

In an embodiment, referring again to FIG. 1, at step 108 of method 100, in order to determine whether the optimal path of the VTOL vehicle intersects with the optimal path of at least one alternative aerial vehicle, as shown in FIG. 9. FIG. 9 depicts at least one type of flight path intersection, including but not limited to: (i) Type A, a pure intersection (e.g., an intersection angle θ>0); and/or a collinear with the same direction; and/or (ii) Type B, collinear with opposite direction. Accordingly, in this embodiment, the flight planning system may perform a time-based status check for the Type A intersection (e.g., potential conflicts).

In embodiments, after the optimal flight path has been calculated, as shown in FIG. 1 at step 108, LTMS 106 of the flight planning system may be configured to conduct at least one conflict check (e.g., determine if a Type A and/or Type B intersection exists) of the optimal flight path via verifying the time interval between the VTOL vehicle and/or at least one alternative aerial vehicle crossing an intersecting point between their respective optimal flight paths. As such, if the time interval is greater than the minimal temporal separation, then there is no conflict. For example, as shown in FIG. 9, in an embodiment, LTMS 106 of the flight planning system may be configured to assume that $S_{i,j,p}$ is the minimum temporal separation between flight i and flight j and/or assume that flight i and flight j may be travelling along each flight path at the same speed, such that LTMS 106 may be configured to utilize the below equation to calculate the time interval and/or minimal temporal separation. In this manner, in this embodiment, the flight planning system, via LTMS 106, may determine that safety may be assured as long as the time interval of the two aircraft crossing the intersection point may be greater than the minimal temporal separation. In addition, in an embodiment, LTMS 106 of the flight planning system may be configured to conduct a conflict check during pre-departure, departure, in-flight, and/or at any stage of flight known in the art. The time interval relationship is expressed in Equation (hereinafter "Eq.") (1), as provided below.

$$|T_{i,p}-T_{j,p}|\geq\delta_{i,j,p} \tag{1}$$

Accordingly, as shown in FIG. 9, in an embodiment, for a Type B conflict, the relationships in Eqs. (2a)-(2b), as provided below, may be used to determine and/or calculate any potential conflict, such that there will be no conflicts when either of the following constraints may be met. In this embodiment, the first relationship may ensure that flight i may arrive at the first intersecting point $p_1$ at a later point in time within the time interval than the point in time that flight j may arrive at the first intersecting point $p_1$, plus the minimal temporal separation $\delta_{i,j,p}$ The second relationship may ensure that flight j may arrive at the second intersecting point $p_2$ at a later point in time than the time flight i may arrive at the second intersecting point $p_2$, plus the minimum temporal separation $\delta_{i,j,p}$.

$$T_{j,p1}\geq T_{i,p1}+\delta_{i,j,p} \text{ or} \tag{2a}$$

$$\leq T_{j,p2}+\delta_{i,j,p} \tag{2b}$$

As such, in an embodiment, if the optimal flight path of the VTOL vehicle does not cross and/or intersect with the optimal flight path of at least one at least one alternative optimal VTOL vehicle and/or at least one obstacle, method 100 may then proceed to step 112, such that the flight planning system may be configured to transmit a notification indicative of at least one conflict-free trajectory to the user and/or the flight planning system may be configured to display the conflict free trajectory on the display device associated with the flight planning system. Additionally, in this embodiment, the flight planning system may be configured to provide a step-by-step analysis and/or directions of the conflict-free trajectory, via an auditory output, a visual output, a tactile output, and/or any sensory output known in the art. In this manner, the processor of the flight planning system may be communicatively coupled with at least one Global Positioning System (hereinafter "GPS") sensor, such that the flight planning system may be configured to monitor the location and/or direction of the VTOL vehicle, such that the flight planning system may provide sensory feedback based on the location and/or direction of the aerial vehicle with respect to the conflict-free trajectory. Additionally, in some embodiments, the flight planning system may be configured to be communicatively coupled with the flight operations of the VTOL vehicle, such that when the optimal flight path is displayed and/or selected by the user, via the at least one user interface, the flight planning system may be configured to active the flight operations (e.g., the engine, the battery, the propellers, the braking system, etc.) of the VTOL vehicle and/or autonomously fly the VTOL vehicle from the origin vertiport to the destination vertiport and/or the at least one alternative destination vertiport.

Moreover, at step 108, in in an embodiment, if LTMS 106 of the flight planning system determines that at least one conflict exists within the optimal flight path of the VTOL vehicle and/or the optimal flight path of the at least one alternative aerial vehicle, method 100 may then proceed to either step 110*a* or step 110*b*. As such, in both steps 110*a* and 110*b*, LTMS 106 may be configured to implement at least one mathematical program and/or algorithm, such that at least one conflict-free trajectory of each flight path of each aerial vehicle may be obtained, optimizing system-wide generalized cost and/or ensuring equity. Accordingly, at step 110*a*, a summation model may be incorporated into the mathematical programming of LTMS 106 to calculate and/or determine the at least one conflict-free trajectory, and at step 110*b*, a multiplication model may be incorporated into the mathematical programming of LTMS 106 to calculate and/or determine the at least one conflict-free trajectory. In this manner, in this embodiment, the flight planning system may be configured to allow the at least one user to select which mathematical model (e.g., the summation model and/or the multiplication model) may be used to calculate the at least one conflict-free trajectory, via at least one user-interface communicatively coupled with LTMS 106 and/or the at least one processor of the flight planning system. Additionally, the flight planning system may be configured to automatically run both mathematical models within the mathematical programming of LTMS 106 in order to identify and/or calculate the at least one conflict-free trajectory for each flight path of the VTOL vehicle and/or the at least one alternative aerial vehicle. As such, the flight planning system may then be configured automatically select the at least one conflict free-trajectory and/or transmit a notification indicative of the at least one conflict free trajectory to the user regarding the optimal flight path, the shortest flight path, and/or the at least one alternative flight path of the VTOL vehicle and/or the at least one alternative aerial vehicle and/or which mathematical model was used to calculate the at least one conflict-free trajectory. In this manner, in some embodiments, when the flight planning system transmits a notification indicative of the at least one conflict-free trajectory, the user may select the optimal flight path, via the at least one user interface, such that the optimal flight path comprising the at least one conflict-free trajectory.

As stated above, as shown in FIG. 1, in an embodiment, for step 110*b* of method 100, if multiple operators (e.g., the VTOL vehicle and at least one alternative aerial vehicle) use the flight planning system, via the at least one server communicatively coupled to the flight planning system, the flight planning system may be configured to ensure equity among each operator by not favoring any one of the operators based on the type of flight path and/or different patterns within the flight path of the operators. Accordingly, in these embodiments, LTMS 106 of the flight planning system may be configured to integrate the summation model of step 110*a* of method 100, such that the summation of generalized cost of all flights may be minimized regardless of equity, and/or at step 110*b* of method 100, LTMS 106 of the flight planning system may be configured to minimize the length of the flight path of each aerial vehicle while also considering equity amongst the multiple operators. In some embodiments, LTMS 106 of the flight planning system may be configured to integrate both the summation model and the multiplication model, such that the generalized cost and/or the length of the flight path of each aerial vehicle may be considered.

The models for step 110*a* and/or step 110*b* are elaborated further after introducing notations, as provided in TABLE 1, which may be used in the models below:

TABLE 1

| | |
|---|---|
| F: | set of flights and $i \in F$. |
| H: $(h_1, \ldots, h_m)$: | set of m flight levels. |
| $L^i \subseteq H$: | set of flight levels allowed for flight i. |
| $I_h{}^i \subseteq F$: | set of flights that spatially intersects with flight i on level h. |
| $P_h{}^{ij} \in \mathbb{R}^2$: | set of spatially intersecting points between flight i and flight k on level h. |
| $P_h{}^{ij12} \subseteq P_h{}^{ij}$: | set of type 1 and type 2 intersecting points. |
| $P_h{}^{ij3} \subseteq P_h{}^{ij}$: | set of type 3 intersecting points. |
| $C_i{}^h$: | flying cost of flight i taking flight level h. |
| $T_{i,p}$: | crossing time of flight i passing an intersecting point $p \in P_h{}^{ij12}$. |
| $T_{i,p1}$: | crossing time of flight i passing the first intersecting point $p_1 \in P_h{}^{i,3}$. |
| $T_{i,p2}$: | crossing time of flight i passing the second intersecting point $p_2 \in P_h{}^{i,3}$. |
| $\delta_{i,j,p}$ | the minimal temporal separation between flight i and j. |
| $\phi_h{}^i \in \{0,1\}: \phi_h{}^i = 1$ | if flight i assigned to flight level h; otherwise, $\phi_h{}^i = 0$. |
| $y_{i,j,h,p} \in \{0,1\}: y_{i,j,h,p} = 1$ | if the intersecting point p of flight i and j is type 3 and satisfies the first relation in (2); |
| $y_{i,j,h,p} = 0$ | If p is type 3 intersection and satisfies the second relation in (2). |

Summation Model:

$$\text{Min } \Sigma_{i \in F} \Sigma_{h \in L^i} C_i^h \phi_h^i \qquad (3)$$

Constraints:

1. Each flight assigned to one and only altitude level:

$$\Sigma_{h \in L^i} \phi_h^i = 1, \forall f \in F \qquad (4)$$

2. Conflict resolution:
   (1) For pure intersection and collinear with same direction:

$$|T_{i,p} - T_{j,p}| \geq \delta_{i,j,p} + M(\phi_h^i + \phi_h^j - 2) \qquad (5)$$

$$\forall \, i \in F, \forall \, j \in I_h^f, \forall \, p \in P_h^{i,j,12}, \forall \, h \in L^i \cap L^i$$

(2) For collinear with opposite direction:

$$y_{i,jhp}(T_{ip_1} - T_{j,p1} - \delta_{i,j,p}) \geq M(\phi_h^i + \phi_h^j - 2) \qquad (6)$$

$$\forall \, i \in F, \, j \in I_h^i, \forall \, p_1, p_2 \in P_h^{i,j3}, \forall \, h \in L^i \cap L^i$$

$$(1 - y_{i,jhp})(T_{i,p_2} - T_{j,p2} + \delta_{i,j,p}) \leq M(2 - \phi_h^i - \phi_h^j) \qquad (7)$$

$$\forall \, i \in F, \, j \in I_h^i, \forall \, p_1, p_2 \in P_h^{i,j3}, \forall \, h \in L^i \cap L^j$$

$$\phi_h^i, \phi_h^j, y_{i,jhp} \in \{0, 1\}$$

As stated above, in an embodiment, referring again to FIG. 1, at step 110*a* of method 100. LTMS 106 of the flight planning system may comprise the at least one summation model. As such, the at least one summation model may be formulated as an integer program with the objective of minimizing total flying cost. Accordingly, an objective function, as shown above in Equation (3), may be configured to sum the flying cost $C_i^h$ of each flight i assigned to the flight level h. Furthermore, the decision variable $\phi_h^i$ may determine which flight level flight i takes. In this manner, in this embodiment, each potential flight of the VTOL vehicle and/or the at least one alternative aerial vehicle may be assigned to the one and only flight level expressed in Equation (4). Additionally, in these embodiments, LTMS 106 of the flight planning system may be configured to input at least one constraint within the summation model. For example, as shown above, in embodiments, LTMS 106 may be configured to integrate constraint (5) into the summation model in order to ensure that the type A conflicts, as shown in FIG. 9, may not be displayed and/or disposed within in the optimal flight path comprising the at least one conflict free-trajectory. Moreover, in this embodiment, the summation model of LTMS 106 may comprise constraint (6) and/or constraint (7) in order to ensure that at least one Type B conflict, as shown in FIG. 9, may not be displayed and/or disposed within the optimal flight path comprising the at least one conflict free-trajectory. In this manner, in an embodiment, in order to resolve Type B opposite direction conflicts, constraint (6) may be configured to ensure that flight i arrives at $p_1$ after the time flight j may arrive at the intersection point plus their required minimal temporal separation $\delta_{i,j,p}$. In this manner, in this embodiment, constraint (7) may also be configured to ensure that flight k arrives at $p_2$ after the time flight i may arrive at $p_2$ plus their required minimal temporal separation $\delta_{i,j,p}$·$y_{i,jhp}$ is a binary variable to fulfill either constraint (6) or (7). As such, "M" may be used to represent a large enough constant in conflict resolution constraints.

For introducing the multiplication model, in embodiments, several new notations may be introduced as follows:
   O: $(o_1, \ldots, o_p)$: set of p operators
   $D_i = \max c_i^h$, $\forall h \in L^i$: maximal flying cost of flight i taking all allowed flight levels.
   $D_o = \Sigma_{i \in o} d_i$, $\forall o \in O$: maximal cost of an operator o Accordingly, as shown in FIG. 1, in an embodiment, at step 110*b* of method 100, LTMS 106 of the flight planning system may be configured to model equity for each flight path and/or each operator, and the term "players" used in the general form may be equivalent to each operator in the multiplication model. Additionally, when modeling equity for each operator, the objective of LTMS 106 of the flight planning system may be to maximize the product of a benefit of each operator, which may be the difference between the reference point $D_i$ and the actual cost Chon, as shown in Equation (8), provided below. Furthermore, in this embodiment, when modeling equity among operators (Equation (9)), the objective of LTMS 106 of the flight planning system may be to maximize the product of each operator's benefit, which may be the difference between the reference point $D_o$ and actual cost $\Sigma_{f \in o} C_i^h \phi_h^i$.

Multiplication Model:

$$\text{Max } \Pi_{f \in F}(D_i - C_i^h \phi_h^i) \qquad (8)$$

$$\text{Max } \Pi_{o \in O}(D_o - \Sigma_{i \in o} C_i^h \phi_h^i) \qquad (9)$$

In this manner, in an embodiment, LTMS 106 of the flight planning system may formulate the summation model as an integer program, such that the summation model may then be solved by any commercial solver known in the art. Accordingly, in order to solve the multiplication model, LTMS 106 of the flight planning system may be configured to reformulate the multiplication model as a convex programming model, which may comprise at least one second-order constraint (e.g., a mixed-integer Second-Order Cone Program (hereinafter "SOCP")). As such, in this embodiment, the multiplication model may be configured to be integrated into and/or be solved effectively by commercial solvers, including but not limited to IBM ILOG CPLEX, Gurobi, and/or FICO Xpress.

In addition, in an embodiment, in order to avoid a Type B conflict, as shown in FIG. 1, at step 110*a* and/or step 110*b* of method 100, LTMS 106 of the flight planning system also comprise at least one deconfliction strategy during pre-flight analysis and/or pre-departure flight planning form the origin vertiport. As such, in this embodiment, a flight level assignment mathematical program and/or algorithm, departure displacement mathematical program and/or algorithm, and/or a rolling window algorithm may be integrated into LTMS 106 of the flight planning system in order to provide at least one conflict free trajectory within the optimal flight path of the VTOL vehicle. In this manner, as provided below, LTMS 106 may comprise a flight level assignment (hereinafter "FLA") model comprising Eqs. (10)-Eqs. (14), such that LTMS 106 of the may be configured to input the following, including but not limited to, the total loss of energy, crew, height, maintenance of the VTOL to determine an optimal cost analysis for the optimal flight path. Eqs. (10)-Eqs. (14) are provided below:

$$\text{Min} \sum_i \sum_h c_{i,h}^{energy} \phi_{i,h} + \tag{10}$$

$$\sum_i \sum_h c^{crew} \left( t_{i,h}^{flying} \right) \phi_{i,h} + \sum_i \sum_h c^{Mait} \cdot \left( t_{i,h}^{flying} \right) \phi_{i,h}$$

$$\text{Where: } c_{i,h}^{energy} = \left( P_{hover} t_{i,h}^{hover} + P_{climb} t_{i,h}^{climb} + P_{cruise} t_{i,h}^{cruise} + \right.$$

$$\left. P_{descent} t_{i,h}^{descent} \right) c^{electricity};$$

$$t_{i,h}^{flying} = t_{i,h}^{hover} + t_{i,h}^{climb} + t_{i,h}^{cruise} + t_{i,h}^{descent}$$

s.t.

$$\overline{\sum}_h \phi_{ih} = 1 \; \forall \, i \in F \tag{11}$$

$$SL_{i,j,h} = (\phi_{i,h} = 1 \wedge \phi_{j,h} = 1) \; \forall \, i, j \in F, \forall \, h \in H \tag{12}$$

$$|(dep_i + t_{i,p}) - (dep_j + t_{j,p})| - \delta_{i,j,p} \ge M(SL_{i,j,h} - 1) \forall \, p \in I_A \tag{13}$$

$$\begin{cases} u_1 \le M_1(1 - SL_{i,j,h}) + \overline{M_1}(1 - y_1) \\ u_2 \le M_2(1 - SL_{i,j,h}) + \overline{M_2}(1 - y_2) \\ \quad y_1 + y_2 = 1 \\ \quad y_1, y_2 \in \{0, 1\} p \end{cases} \; \forall \, p_1, p_2 \in I_B \tag{14}$$

$$\phi_{ih}, SL_{i,j,h} \in \{0, 1\}$$

Where:

$$u_1 = dep_i + t_{i,p_2} + \delta_{i,j,p_2} - dep_j - t_{j,p_2}$$

$$u_2 = dep_i + t_{j,p_1} + \delta_{i,j,p_1} - dep_i - t_{i,p_1}$$

$$M_1 = \max(u_1), M_2 = \max(u_2)$$

$$\overline{M_1} = \max(u_1 - M_1(1 - SL_{i,j,h}))$$

$$\overline{M_2} = \max(u_2 - M_2(1 - SL_{i,j,h}))$$

As stated above, in an embodiment, LTMS 106 may comprise a multifaceted mathematical program and/or algorithm, such that the FLA may account for any departure delay by the VTOL vehicle and/or the at least one alternative aerial vehicle. In this embodiment, LTMS 106, via the FLA+Departure Delay (hereinafter "FLA+DD") mathematical program and/or algorithm, may be configured to determine an optimal cost base analysis in addition to the shortest path between the origin vertiport and the destination vertiport and/or at least one alternative vertiport. In this manner, the FLA+DD mathematical program and/or model may account for the ascent and/or descent of the VTOL vehicle during the flight and/or the cost of energy to accomplish those tasks and/or the time required to hover, climb, cruise, and/or descent during the flight operations on the flight path. Accordingly, in this embodiment, the FLA+DD mathematical program and/or algorithm may comprise Eqs. (15)-(19), as provided below:

$$\text{Min} \sum_i \sum_h c_{i,h}^{energy} \phi_{i,h} + \tag{15}$$

$$\sum_i \sum_h c_{i,h}^{crew} \left( t_{i,h}^{flying} \right) \phi_{i,h} + \sum_i \sum_h c^{Mait} \cdot \left( t_{i,h}^{flying} \right) \phi_{i,h}$$

$$\text{Where: } c_{i,h}^{energy} = \begin{pmatrix} P_{hover} t^{hover} + P_{climb} t_{i,h}^{climb} + P_{cruise} t_{i,h}^{cruise} + \\ P_{descent} t_{i,h}^{descent} \end{pmatrix} c^{electricity};$$

$$t_{i,h}^{flying} = t_{i,h}^{hover} + t_{i,h}^{climb} + t_{i,h}^{cruise} + t_{i,h}^{descent}$$

s.t.

$$\sum_h \phi_{ih} = 1 \; \forall \, i \in F \tag{16}$$

$$SL_{i,j,h} = (\phi_{i,h} = 1 \wedge \phi_{j,h} = 1) \; \forall \, i, j \in F, \forall \, h \in H \tag{17}$$

$$\begin{cases} (t_{i,j} + d_i - d_j) + \overline{M_1} y_1 \ge \delta_{i,j,p} + M(SL_{i,j,h} - 1) \\ -(t_{i,j} + d_i - d_j) + \overline{M_2}(1 - y_1) \ge \delta_{i,j,p} + M(SL_{i,j,h} - 1) \quad \forall_P \in I_A \\ \quad y_1 \in \{0, 1\} \end{cases} \tag{18}$$

$$\begin{aligned} t_{i,j} &= dep_i + t_{i,p} - dep_j - t_{j,p} \tag{19} \\ M &= \max(\delta_{i,j,p} - |t_{i,j} + d_i - d_j|) \\ \text{Where: } \overline{M_1} &= \max(-t_{i,j} - d_i + d_j + \delta_{i,j,p}) \\ \overline{M_2} &= \max(t_{i,j} + d_i - d_j + \delta_{i,j,p}) \end{aligned}$$

$$\begin{cases} u_1 + d_i - d_j \le M_3(1 - SL_{i,j,h}) + \overline{M_3}(1 - y_2) \\ u_2 + d_j - d_i \le M_4(1 - SL_{i,j,h}) + \overline{M_4} y_2 \\ \quad y_2 \in \{0, 1\} \quad \forall \, p_1, p_2 \in I_B \\ \quad \underline{d_i} \le d_i \le \overline{d_i} \end{cases}$$

$$\text{Where: } u_1 = dep_i + t_{i,p_2} + s_{i,j,p_1} - dep_j - t_{j,p_2}$$

$$u_2 = dep_j + t_{j,p_1} + s_{i,j,p_1} - dep_i - t_{i,p_1}$$

$$M_3 = \max(u_1 + d_i - d_j)$$

$$M_4 = \max(u_2 + d_j - d_i)$$

$$\overline{M_3} = M_3$$

$$\overline{M_4} = M_4$$

Furthermore, in an embodiment, LTMS 106 of the flight planning system may comprise at least one Rolling Window Algorithm. As such, in this embodiment, the rolling window algorithm may be configured to break down the cost analysis and/or the shortest flight path issue into a small number of problems. In this manner, LTMS 106 may be configured to divide the time interval into a number of time windows (e.g., $T:(t_1, t_2, \ldots, t_n)$), such that LTMS 106 may solve each potential conflict (e.g., at least one intersection between the flight path of the VTOL vehicle and the flight path for the at least one alternative aerial and/or at least one obstacle) at each time window for flights departing within that window and/or for flight departing beforehand but not having landed yet. The Rolling Window Algorithm is provided below:

Algorithm 1: Rolling window algorithm

| input: | Type A, Type B intersection: $I_A$, $I_B$ |
| | Time windows: $t \in T$ |
| | Flights: $i \in F$ |
| | Flights scheduled to depart in time window t: F[t] |
| | Flight levels: $h \in H$ |
| output: | flight i assigned to level h: $\phi_{i,j} \in \phi$ |
| | flight i departure delay: $d_i \in D$ |
| | flight i and j take same flight level: $SL_{i,j} \in SL$ | initialization:
1          $t \leftarrow 0$
2          $F_0^* \leftarrow \emptyset$   # flights not landing in the current time window
3          $\Phi_0^* \leftarrow \emptyset$   # level assignment of flights not landing in the current time window
4          $D_0^* \leftarrow \emptyset$    # departure delay of flights not landing in the current time window
5          while $t \le |T|$ do
6          |    $F_t \leftarrow F_{t-1}^* \cup F[t]$
7          |    $\Phi_t \leftarrow \Phi_{t-1}^* \cup \Phi[t]$
8          |    $D_t \leftarrow F_t$
9          |    # indicator variable set among F[t] by the Cartesian product
10         |    $SL_{t,t} \leftarrow F[t] \times F[t] \times H$
11         |    # indicator variable set between F[t] and $F_{t-1}^*$ by Cartesian product
12         |    for i, h in $\Phi_{t-1}^*$ do
13         |    |    conduct Cartesian product between F[t], i, and h.
14         |    |_   append results to $SL_{t,t-1}$
15         |    $SL_t \leftarrow SL_{t,t} \cup SL_{t,t-1}$
16         |    # Create conflict set for Type A and Type B in the current time window
17         |    C_typeA $\leftarrow \emptyset$
18         |    C_typeB $\leftarrow \emptyset$
19         |    for i, j, h in $SL_t$ do
20         |    |    if flight i, j not temporally overlapping with each other do
21         |    |    |    OD(i) $\leftarrow$ retrieve OD name of flight i
22         |    |    |    OD(j) $\leftarrow$ retrieve OD name of flight j
23         |    |    |    if (OD(i), OD(j), h) in $I_A$ then
24         |    |    |    |_   append (i, j, h) to C_typeA and $SL_t^c$
25         |    |    |    elseif (OD(i), OD(j), h) in $I_B$ then
26         |    |_   |_   |_   append (i, j, h) to C_typeB and $SL_t^c$
27         |    y $\leftarrow$ C_typeA
28         |    y1, y2 $\leftarrow$ C_typeB
29         |    build the flight level assignment + departure delay model
30         |        add additional constraints to enforce flights in $F_{t-1}^*$ taking their assigned level from t − 1
31         |        add additional constraints to enforce flights in $F_{t-1}^*$ delay same as from t − 1
32         |        solve the problem by a commercial solver
33         |        return $\Phi_t$, $D_t$
34         |    for i, h in $\Phi_t$ do
35         |        if $\Phi_t(i, h) > 0.5$ & mission not completed in t + 1 then
36         |        |_   append (i, h) to $\Phi_t^*$
37         |    for i, h in $\Phi_t$ do
38         |    |_   append (i) to $F_t^*$
39         |    for i in $F_t^*$ do
40         |_   |_   [ append (i) to $D_t^*$ As such, once the at least one conflict free trajectory within the optimal path has been determined and/or calculated, via the summation mathematical program, the multiplication mathematical program, the FLA mathematical program, the FLA+DD mathematical program, and/or the Rolling Window Algorithm, method 100 may then proceed to step 112, as stated above, such that the flight planning system may be configured to transmit a notification indicative of the at least one conflict free trajectory of the optimal flight path to the user and/or the flight planning system may be configured to display the at least one conflict free trajectory of the optimal flight path on the display device associated with the flight planning system.

Additionally, in some embodiments, the flight planning system may be configured to provide a step-by-step analysis and/or directions of the conflict-free trajectory, via an auditory output, a visual, a tactile, and/or any sensory output known in the art. In this manner, in these other embodiments, the processor of the flight planning system may be in electrical communication with at least one Global Positioning System (hereinafter "GPS") sensor, such that the flight planning system may be configured to monitor the location and/or direction of the aerial vehicle, such that the flight planning system may provide sensory feedback based on the location and/or direction of the aerial vehicle with respect to the conflict-free trajectory. Additionally, in some embodiments, the flight planning system may be configured to be communicatively coupled with the flight operations of the VTOL vehicle, such that when the optimal flight path is displayed and/or selected by the user, via the at least one user interface, the flight planning system may be configured to active the flight operations (e.g., the engine, the battery, the propellers, the braking system, etc.) of the VTOL vehicle and/or autonomously fly the VTOL vehicle from the origin vertiport to the destination vertiport and/or the at least one alternative destination vertiport Moreover, in some embodiments, LTMS 106 may be configured to be communicatively coupled with the memory of the flight planning system, at least one third-party database, and/or at least one flight path server, such that LTMS 106 may transmit the optimal path, the shortest path, the at least one alternative path comprising at least one conflict free trajectory and/or any data known in the art related to calculating the at least one conflict free trajectory to the memory of the flight planning system, the at least one third-party database, and/or the at least one flight path server, creating a trained conflict-free trajectory dataset. As such, in these other embodiments, LTMS 106 of the flight planning system may be configured to optimize the calculation of the at least one conflict-free trajectory for the optimal flight path comprising at least one conflict (e.g., an intersection with a flight path of at least one alternative aerial vehicle, and/or at least one obstacle). For example, in these other embodiments, if a substantially similar optimal path comprising at least one conflict is inputted into LTMS 106, LTMS 106 may be configured to select the mathematical model that provides the conflict free-trajectory for the optimal path and/or may be configured to calculate the conflict free-trajectory in the shortest amount of time based on previous calculations retrieved from the trained conflict-free trajectory dataset.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A method of automatically generating a flight path of an aerial vehicle within an urban air environment, the method comprising the steps of:

loading, into a memory of the computing device, at least one imaging database comprising a plurality of building feature points, at least one flight operation request, or both, wherein the at least one flight operation request comprises at least one vertiport, a flight path of at least one alternative aerial vehicle, or both, whereby the plurality of building feature points are configured to be clustered based on at least one dimension of at least one preidentified building;

producing, via at least one processor, at least one three-dimensional map based on the at least one imaging database by:

identifying, via the processor, a building footprint based on at least one cluster of the plurality of building feature points; and generating, via the processor, at least one two-dimensional bounding box surrounding a perimeter of the building footprint;

calculating, via the at least one processor, a shortest flight path between at least two of the plurality of vertiports based on the at least two vertiports, the flight operation request, or both;

calculating, via the at least one processor, at least one alternative flight path between at least two of the plurality of vertiports based on the at least two vertiports, flight operation request, or both;

detecting, via the at least one processor, one or more temporal conflicts between the shortest flight path, at least one alternative flight path, or both and at least one alternative aerial vehicle;

classifying, via the at least one processor, the one or more temporal conflicts as a first type conflict, second type conflict, or both;

automatically displaying, via the at least one processor, the calculated shortest flight path within the at least one three-dimensional map on a display device associated with computing device by:

responsive to the determination that the calculated shortest flight path does not include any portion of the least one bounding box between the at least two vertiports, highlighting the calculated shortest flight path in a high contrast color; and responsive to the determination that the calculated shortest flight path includes portion of the at least one bounding box between the at least two vertiports, removing the calculated shortest path from the at least one three-dimensional map; and automatically displaying, via the at least one processor, the at least one alternative flight path on the display device with a visual differentiation relative to the calculated shortest flight path.

2. The method of claim 1, wherein the step of determining the at least one shortest flight path further includes the steps of:

identifying, via the at least one processor, at least one portion of the at least one bounding box between the at least two vertiports based on the at least one inputted vertiport, flight operation request, or both;

calculating, via the at least one processor, at least one flight path between the at least two vertiports, wherein the at least one flight path does not intersect, include, or both any portion of the at least one bounding box between the at least two vertiports; and selecting, via the at least one processor, the shortest flight path, wherein the shortest flight path comprises the lowest total distance, total amount of time, or both.

3. The method of claim 1, further comprising the step of, receiving, via the at least one processor of the computing device, an input of a designated airspace, restricted airspace, or both, based on the aerial vehicle.

4. The method of claim 3, wherein the step of producing the three-dimensional map further comprises the steps of:

identifying, via the at least one processor, the plurality of building feature points within the inputted designated airspace; and removing, via the at least one processor, each of the plurality of building feature points not within the inputted designated airspace.

5. The method of claim 3, wherein the step of generating the at least one bounding box further includes the step of, converting, via the at least one processor, at least one cluster of the plurality of building feature points into at least one cluster of raster points with respect to the designated airspace.

6. The method of claim 1, wherein the three dimensional map is a geographic information system (hereinafter "GIS") map.

7. The method of claim 1, further comprising the step of, receiving, via the at least one user interface associated with the computing device, an input from a user to generate the at least one shortest path between the at least two vertiports.

8. The method of claim 1, further comprising the step of, after automatically displaying the at least one shortest path within the at least one three-dimensional map on the display device associated with the computing device, automatically recording, via the at least one processor, within the memory of the computing device, the at least one vertiport, the at least one flight operation request, or both.

9. A method of automatically generating an optimized flight path of an aerial vehicle within an urban air environment, the method comprising the steps of:

loading, into a memory of the computing device, at least one imaging database comprising a plurality of building feature points, at least one flight operation request, or both, wherein the at least one flight operation request comprises at least one vertiport, a flight path of at least one alternative aerial vehicle, or both, whereby the plurality of building feature points are configured to be clustered based on at least one dimension of at least one preidentified building;

producing, via at least one processor, at least one three-dimensional map based on the at least one imaging database by:

identifying, via the processor, a building footprint based on at least one cluster of the plurality of building feature points; and generating, via the processor, at least one two-dimensional bounding box surrounding a perimeter of the building footprint;

calculating, via the at least one processor, a shortest flight path between at least two of the plurality of vertiports based on the at least two vertiports, the flight operation request, or both;

calculating, via the at least one processor, at least one alternative flight path between at least two of the plurality of vertiports based on the at least two vertiports, flight operation request, or both;

storing, into a memory of the computing device, the shortest flight path, the at least one alternative valid flight path, or both;

detecting, via the at least one processor, one or more temporal conflicts between the shortest flight path, at least one alternative flight path, or both and at least one alternative aerial vehicle;

classifying, via the at least one processor, the one or more temporal conflicts as a first type conflict, second type conflict, or both;

resolving, via the at least one processor, the one or more temporal conflicts by enforcing a predetermined minimum temporal separation to generate a conflict-free shortest flight path;

comparing, via the at least one processor, the calculated shortest flight path and a flight path of at least one alternative aerial vehicle; and automatically displaying the conflict free flight path within the at least one three-dimensional map on a display device associated with the computing device by:

responsive to the determination that the conflict free flight path does not include any portion of the at least one bounding box between the at least two vertiports, does not intersect with the shortest path of at least one alternative aerial vehicle, or both, highlighting the shortest path in a high contrast color on a display device associated with the computing device; and responsive to the determination that the conflict free flight path includes any portion of the at least one bounding box between the at least two vertiports, does not intersect with the shortest path of at least one alternative aerial vehicle, or both, removing the calculated at least one shortest path from the at least one three-dimensional map-; and automatically displaying, via the at least one processor, the at least one alternative flight path on the display device with a visual differentiation relative to the calculated shortest flight path.

10. The method of claim 9, wherein the step of determining the at least one shortest flight path further includes the steps of:

identifying, via the at least one processor, at least one portion of the at least one bounding box between the at least two vertiports based on the at least one inputted vertiport, flight operation request, or both;

calculating, via the at least one processor, at least one flight path between the at least two vertiports, wherein the at least one flight path does not intersect, include, or both any portion of the at least one bounding box between the at least two vertiports; and selecting, via the at least one processor, the shortest flight path, wherein the shortest flight path comprises the lowest total distance, total amount of time, or both.

11. The method of claim 9, further comprising the step of, receiving, via the at least one processor of the computing device, an input of a designated airspace, restricted airspace, or both, based on the aerial vehicle.

12. The method of claim 11, wherein the step of producing the three-dimensional map further comprises the steps of:

identifying, via the at least one processor, the plurality of building feature points within the inputted designated airspace; and removing, via the processor, each of the plurality of building feature points not within the inputted designated airspace.

13. The method of claim 11, wherein the step of generating the at least one bounding box further includes the step of, converting, via the at least one processor, at least one cluster of the plurality of building feature points into at least one cluster of raster points with respect to the designated airspace.

14. The method of claim 9, wherein the three dimensional map is a geographic information system (hereinafter "GIS") map.

15. The method of claim 9, further comprising the step of, receiving, via the at least one user interface associated with the computing device, an input from a user to generate the at least one shortest path between the at least two vertiports.

16. The method of claim 9, further comprising the step of, after automatically displaying the at least one shortest path within the at least one three-dimensional map on the display device associated with the computing device, automatically recording, via the at least one processor, within the memory of the computing device, the at least one vertiport, the at least one flight operation request, or both.

17. A flight planning optimization system for automatically optimizing a flight plan for an aerial vehicle within an urban air environment, the flight planning optimization system comprising:

a computing device having at least one processor; and a non-transitory computer-readable medium operably coupled to the at least one processor, the computer-readable medium having computer-readable instructions stored thereon that, when executed by the at least one processor, cause the flight planning optimization system to automatically optimize the flight plan of the aerial vehicle within the urban air environment by executing instructions comprising:

loading, into a memory of the computing device, at least one imaging database comprising a plurality of building feature points, at least one flight operation request, or both, wherein the at least one flight operation request comprises at least one vertiport, a flight path of at least one alternative aerial vehicle, or both, whereby the plurality of building feature points are configured to be clustered based on at least one dimension of at least one preidentified building;

producing, via at least one processor, at least one three-dimensional map based on the at least one imaging database by:

identifying, via the processor, a building footprint based on at least one cluster of the plurality of building feature points; and generating, via the processor, at least one two-dimensional bounding box surrounding a perimeter of the building footprint;

calculating, via the at least one processor, a shortest flight path between at least two of the plurality of vertiports based on the at least two vertiports, the flight operation request, or both;

calculating, via the at least one processor, at least one alternative flight path between at least two of the plurality of vertiports based on the at least two vertiports, the flight operation request, or both;

storing, into a memory of the computing device, the shortest flight path, the at least one alternative flight path, or both;

comparing, via the at least one processor, the calculated shortest flight path and a flight path of at least one alternative aerial vehicle;

detecting one or more temporal conflicts between the shortest flight path, at least one alternative flight path, or both and the flight path of the at least one alternative aerial vehicle;

classifying the one or more temporal conflicts as a first type temporal conflict corresponding to interesting flight path, a second type temporal conflict corresponding to co-linear paths, or both;

resolving, via the at least one processor, the one or more temporal conflicts by enforcing a predetermined minimum temporal separation to generate a conflict-free shortest flight path;

automatically displaying the conflict free flight path within the at least one three-dimensional map on a display device associated with the computing device by:

responsive to the determination that the conflict free flight path does not include any portion of the at least one bounding box between the at least two vertiports, does not intersect with the shortest path of at least one alternative aerial vehicle, or both, highlighting the shortest path in a high contrast color on a display device associated with the computing device; and responsive to the determination that the conflict free flight path includes any portion of the at least one bounding box between the at least two vertiports, does not intersect with the shortest path of at least one alternative aerial vehicle, or both, removing the calculated at least one shortest path from the at least one three-dimensional map; and automatically displaying, via the at least one processor, the at least one alternative flight path on the display device with a visual differentiation relative to the calculated shortest flight path.

18. The flight planning optimization system of claim 17, wherein the executed instructions further comprise the step of, receiving, via the at least one processor of the computing device, an input of a designated airspace, restricted airspace, or both, based on the aerial vehicle.

19. The flight planning optimization system of claim 18, wherein the executed instructions further comprise the steps of:

identifying, via the at least one processor, the plurality of building feature points within the inputted designated airspace; and removing, via the at least one processor, each of the plurality of building feature points not within the inputted designated airspace.

20. The flight planning optimization system of claim 18, wherein the step of determining the at least one shortest flight path further includes the steps of:

identifying, via the at least one processor, at least one portion of the at least one bounding box between the at least two vertiports based on the at least one inputted vertiport, flight operation request, or both;

calculating, via the at least one processor, at least one flight path between the at least two vertiports, wherein the at least one flight path does not intersect, include, or both any portion of the at least one bounding box between the at least two vertiports; and selecting, via the at least one processor, the shortest flight path, wherein the shortest flight path comprises the lowest total distance, total amount of time, or both.

* * * * *